(12) United States Patent
Zhang et al.

(10) Patent No.: US 11,674,654 B2
(45) Date of Patent: Jun. 13, 2023

(54) VEHICLE LIGHT OPTICAL ELEMENT, VEHICLE LIGHT MODULE, VEHICLE HEADLIGHT, AND VEHICLE

(71) Applicant: HASCO VISION TECHNOLOGY CO., LTD., Shanghai (CN)

(72) Inventors: Dapan Zhang, Shanghai (CN); Zhiping Qiu, Shanghai (CN); He Zhu, Shanghai (CN); Wenhui Sang, Shanghai (CN); Hui Li, Shanghai (CN); Fang Liu, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 99 days.

(21) Appl. No.: 17/419,595

(22) PCT Filed: Apr. 17, 2020

(86) PCT No.: PCT/CN2020/085405
§ 371 (c)(1),
(2) Date: Jun. 29, 2021

(87) PCT Pub. No.: WO2020/244316
PCT Pub. Date: Dec. 10, 2020

(65) Prior Publication Data
US 2022/0120401 A1 Apr. 21, 2022

(30) Foreign Application Priority Data

Jun. 5, 2019 (CN) .................. 201910488336.X
Jun. 5, 2019 (CN) .................. 201920859938.7
(Continued)

(51) Int. Cl.
*F21S 41/19* (2018.01)
*F21S 41/37* (2018.01)
(Continued)

(52) U.S. Cl.
CPC .......... *F21S 41/192* (2018.01); *B60Q 1/1423* (2013.01); *F21S 41/143* (2018.01); (Continued)

(58) Field of Classification Search
CPC ...... F21W 2107/10; F21S 41/00; F21S 41/37; F21S 41/43; F21S 41/151; F21S 41/20; F21S 41/24; F21S 41/295; F21S 41/27
See application file for complete search history.

(56) References Cited

U.S. PATENT DOCUMENTS

2007/0070638 A1 3/2007 Fukawa et al.
2020/0132268 A1 4/2020 Zhang et al.

FOREIGN PATENT DOCUMENTS

CN 101109495 A * 1/2008
CN 201050708 Y * 4/2008
(Continued)

OTHER PUBLICATIONS

Search English translation of CN 201050708 Y (Year: 2008).*
(Continued)

*Primary Examiner* — Omar Rojas Cadima
(74) *Attorney, Agent, or Firm* — Maine Cernota & Rardin

(57) ABSTRACT

A vehicle light optical element (VLOE) comprises a light incident portion, a transmission portion, and a light emitting portion sequentially arranged from back to front. The light incident portion comprises an illuminating light incident structure (ILIS) and at least one high-beam light incident structure (HBLIS), in which an illuminating light incident surface of the ILIS is adapted to receive auxiliary light during low-beam lighting. Alternatively, the light incident portion comprises an ILIS and at least one HBLIS, in which the ILIS is either a flat surface, a curved cylindrical body protruding backwards, a hemispherical body protruding backwards, or a light condensing structure. The ILIS is
(Continued)

adapted to receive auxiliary lighting light during low-beam lighting. The ILIS is provided on the VLOE, such that when a vehicle light is in a low-beam lighting mode, the VLOE is also luminous, thereby improving the aesthetic appearance of the vehicle light.

20 Claims, 14 Drawing Sheets

(30) Foreign Application Priority Data

| Aug. 8, 2019 | (CN) | 201910730411.9 |
|---|---|---|
| Aug. 22, 2019 | (CN) | 201910780200.6 |
| Aug. 22, 2019 | (CN) | 201910780214.8 |
| Aug. 22, 2019 | (CN) | 201921371967.5 |
| Aug. 22, 2019 | (CN) | 201921377564.1 |
| Aug. 22, 2019 | (CN) | 201921377675.2 |

(51) Int. Cl.
| | |
|---|---|
| *F21S 41/20* | (2018.01) |
| *F21S 41/43* | (2018.01) |
| *F21S 41/24* | (2018.01) |
| *F21S 41/143* | (2018.01) |
| *F21S 45/47* | (2018.01) |
| *F21S 41/29* | (2018.01) |
| *B60Q 1/14* | (2006.01) |
| *F21W 102/20* | (2018.01) |
| *F21W 107/10* | (2018.01) |

(52) U.S. Cl.
CPC ............... *F21S 41/20* (2018.01); *F21S 41/24* (2018.01); *F21S 41/295* (2018.01); *F21S 41/37* (2018.01); *F21S 41/43* (2018.01); *F21S 45/47* (2018.01); *F21W 2102/20* (2018.01); *F21W 2107/10* (2018.01)

(56) References Cited

FOREIGN PATENT DOCUMENTS

| CN | 201561363 U | 8/2010 | |
|---|---|---|---|
| CN | 204005632 U | 12/2014 | |
| CN | 205640631 U | 10/2016 | |
| CN | 206001356 U | 3/2017 | |
| CN | 107002963 A | 8/2017 | |
| CN | 109268774 A | 1/2019 | |
| CN | 109539168 A | 3/2019 | |
| CN | 208804624 U | 4/2019 | |
| CN | 208846328 U | 5/2019 | |
| DE | 10019225 A1 | 10/2000 | |
| FR | 3081969 A1 * | 12/2019 | ........... B60Q 1/0041 |
| JP | 2015185533 A | 10/2015 | |

OTHER PUBLICATIONS

Search English translation of CN 101109495 A (Year: 2008).*
Search English translation of FR 3081969 A1 (Year: 2019).*
International Search Report and Written Opinion for PCT Application No. PCT/CN2020/085405, dated Jul. 9, 2020, 11 pages.
Machine translation of Chinese Patent No. CN109268774A.

* cited by examiner

VEHICLE LIGHT OPTICAL ELEMENT, VEHICLE LIGHT MODULE, VEHICLE HEADLIGHT, AND VEHICLE

CROSS REFERENCE TO RELATED APPLICATIONS

The present application is a national phase application filed under 35 USC § 371 of PCT Application No. PCT/CN2020/085405, with an international filing date of Apr. 17, 2020, which claims priority to Chinese patent applications 201910488336.X and 201920859938.7 filed on Jun. 5, 2019, Chinese patent application 201910730411.9 filed on Aug. 8, 2019, and Chinese patent applications 201921371967.5, 201910780200.6, 201921377675.2, 201910780214.8 and 201921377564.1 filed on Aug. 22, 2019. Each of these applications is herein incorporated by reference in its entirety for all purposes.

FIELD OF THE INVENTION

The present disclosure relates to an automobile light, in particular, to a vehicle light optical element. In addition, the present disclosure also relates to a vehicle light module, a vehicle headlight, and a vehicle.

BACKGROUND OF THE INVENTION

Existing vehicle headlights are usually provided with vehicle light modules. A vehicle light module refers to a device or unit which is used alone or in combination and capable of achieving different illumination functions of a vehicle, such as a matrix headlight module, that is, a vehicle light module that can subdivide a high-beam illumination area into multiple illumination areas to achieve an ADB (Adaptive Driving Beam) function, can adaptively change a high-beam shape according to road conditions, and is shielded from a target object ahead of the vehicle, to avoid dazzling other users on the road and improve driving safety. A primary optical element (such as a reflector and a light guide) and a secondary optical element (such as a lens) are usually provided in the vehicle light module.

An existing vehicle headlight includes a low-beam illumination module and a high-beam illumination module, and correspondingly, has a low-beam illumination mode and a high-beam illumination mode. When the vehicle headlight is in the low-beam illumination mode, the high-beam illumination module generally does not emit light, such that a part of the vehicle headlight is bright while the other part is dark as viewed in front of the vehicle, thus affecting the aesthetics of the appearance of the vehicle headlight.

In view of the above-mentioned shortcomings of the prior art, there is a need to design a vehicle light optical element.

SUMMARY OF THE INVENTION

A problem to be solved by a first aspect of the present disclosure is providing a vehicle light optical element, which is simple in structure and good in lighting-up effect.

In addition, a problem to be solved by a second aspect of the present disclosure is providing a vehicle light module, a vehicle light optical element of which is simple in structure and good in lighting-up effect.

Further, a problem to be solved by a third aspect of the present disclosure is providing a vehicle headlight, which is simple in dimming and good in lighting-up effect.

Still further, a problem to be solved by a fourth aspect of the present disclosure is providing a vehicle, a vehicle light module of which is simple in dimming and good in lighting-up effect.

To solve the above-mentioned technical problems, the first aspect of the present disclosure provides a vehicle light optical element, which includes a light incident portion, a transmission portion and a light emitting portion successively from rear to front, wherein the light incident portion includes a lighting-up incident structure and at least one high-beam light incident structure, the lighting-up incident structure including a lighting-up incident surface, which is adapted to receive auxiliary illuminating light during low-beam illumination; or the light incident portion includes a lighting-up incident structure and at least one high-beam light incident structure, wherein the lighting-up incident structure is a plane, an arc-shaped cylindrical body protruding rearward, a hemisphere protruding rearward, or a light-concentrating structure, and the lighting-up incident structure is adapted to receive auxiliary illuminating light during low-beam illumination.

As a preferred embodiment of the present disclosure, the high-beam light incident structure is arranged in a matrix, and the high-beam light incident structure is provided in at least one row on an end face of the light incident portion.

As another preferred embodiment of the present disclosure, the light incident portion has a concave cavity recessed toward a front end, and the lighting-up incident surface of the lighting-up incident structure is provided at the front end of the concave cavity.

More preferably, the area of a lengthwise section of the transmission portion gradually increases along a light transmission direction.

As yet another preferred embodiment of the present disclosure, the high-beam light incident structure includes a high-beam incident surface, and the high-beam incident surface is a curved surface protruding toward a rear end; or the high-beam light incident structure is a light-condensing cup structure, and a light incident end of the light-condensing cup structure is a planar surface, or the bottom of the light-condensing cup structure is provided with a groove having a rearwardly protruding curved surface formed therein; or the high-beam light incident structure is a cone protruding rearward.

As a specific structural form of the present disclosure, the light emitting surface of the light emitting portion is a curved surface protruding forward; the width in a left-right direction of an end of the light emitting portion connected with the transmission portion is greater than the width in the left-right direction of an end of the transmission portion connected with the light emitting portion; and the height in an up-down direction of the end of the light emitting portion connected with the transmission portion is greater than the height in the up-down direction of the end of the transmission portion connected with the light emitting portion.

More specifically, upper, lower, left and right side faces of the light emitting portion gradually draw closer to an optical axis along a light transmission direction.

As another specific structural form of the present disclosure, an extinction coating or extinction contours are provided on peripheral side faces of the transmission portion.

More specifically, a light-shielding structure is provided on peripheral side faces of the transmission portion, and the light-shielding structure is a black plastic light-shielding layer, a black silica gel light-shielding layer or a black rubber light-shielding layer.

Further specifically, portions of left and right side faces of the transmission portion close to the light incident portion are parallel to an optical axis and extend toward the light emitting portion, and portions of the left and right side faces of the transmission portion close to the light emitting portion gradually draw closer to the optical axis while extending toward the light emitting portion; and upper and lower side faces of the transmission portion gradually tilt away from the optical axis while extending from the light incident portion toward the light emitting portion.

The second aspect of the present disclosure provides a vehicle light module, which includes, successively from rear to front, a fixing frame, a radiator, a circuit board, a light source arranged on a front end face of the circuit board, and the vehicle light optical element of any one of the technical solutions described above, wherein the fixing frame and the radiator are connected through at least three ball head screw assemblies; and the vehicle light optical element is fixedly connected with the circuit board and the radiator.

As a preferred embodiment of the present disclosure, the light source includes a illuminating light source and a high-beam light source; the illuminating light source is arranged corresponding to the lighting-up incident structure, and the high-beam light source is in one-to-one correspondence with the high-beam light incident structure; the illuminating light source is arranged above the high-beam light source; and auxiliary illuminating light is received during low beam illumination after light emitted by the illuminating light source passes through the vehicle light optical element.

Preferably, a rear end of the transmission portion is connected with a mounting portion, and lateral sides of the transmission portion are provided with reinforcing rib structures connected to the mounting portion.

More preferably, mounting legs are further provided on a rear end face of the mounting portion, and the mounting legs are supported on the circuit board.

Typically, the ball head screw assembly includes a ball head screw and a ball head nut, wherein the ball head screw includes a ball head portion and a screw connected with the ball head portion; the ball head nut includes an annular body, an inner side of the annular body being provided with or integrally formed with four elastic clamping pieces, and an end of the annular body being provided with or integrally formed with four elastic clamping legs; or the ball head nut includes an annular body, an inner side of the annular body being provided with or integrally formed with four elastic clamping pieces, and an end of the annular body being provided with or integrally formed with two elastic clamping legs and an reinforcing rib structure, the two elastic clamping legs being arranged oppositely, and the reinforcing rib structure being arranged between the two elastic clamping legs; the elastic clamping pieces and the elastic clamping legs enclose a ball head nut cavity, and the ball head nut cavity is adapted to accommodate the ball head portion; the elastic clamping pieces are capable of preventing the ball head portion from escaping from the ball head nut cavity; and the elastic clamping legs are adapted for clamped connection with the radiator.

Further specifically, a center connecting line between the ball head portions of two of the ball head screws extends in the left-right direction, and a center connecting line between the ball head portions of one of the two ball head screws and of the rest ball head screw extend in the up-down direction.

Still further specifically, the radiator and the circuit board are both provided with positioning pin matching holes, which are adapted to cooperate with positioning structures to connect the vehicle light optical element to the radiator and the circuit board.

The third aspect of the present disclosure provides a vehicle headlight, which includes the vehicle light module according to any one of the technical solutions described above, wherein a plurality of vehicle light modules are provided, and the plurality of vehicle light modules are arranged in the vehicle headlight in an integrated or dispersed manner; or a plurality of vehicle light modules are provided, and the vehicle light modules are distributed in the vehicle headlight in a longitudinal, transverse or oblique arrangement manner.

The fourth aspect of the present disclosure provides a vehicle, which includes the vehicle headlight according to the technical solution described above.

In the above technical solutions, the vehicle light optical element of the present disclosure includes a light incident portion, a transmission portion and a light emitting portion successively from rear to front, wherein the light incident portion includes a lighting-up incident structure and at least one high-beam light incident structure, the lighting-up incident structure including a lighting-up incident surface, which is adapted to receive auxiliary illuminating light during low-beam illumination; or the light incident portion includes a lighting-up incident structure and at least one high-beam light incident structure, wherein the lighting-up incident structure is a plane, an arc-shaped cylindrical body protruding rearward, a hemisphere protruding rearward, or a light-concentrating structure, and the lighting-up incident structure is adapted to receive auxiliary illuminating light during low-beam illumination With the lighting-up incident structure, the vehicle light optical element of the present disclosure may achieve that the vehicle light optical element is also emitting light when the vehicle light is in the low beam illumination mode, so that the appearance of the vehicle light is more beautiful. Other advantages of the present disclosure and technical effects of the preferred embodiments will be further described in the following specific embodiments.

Figure 1:
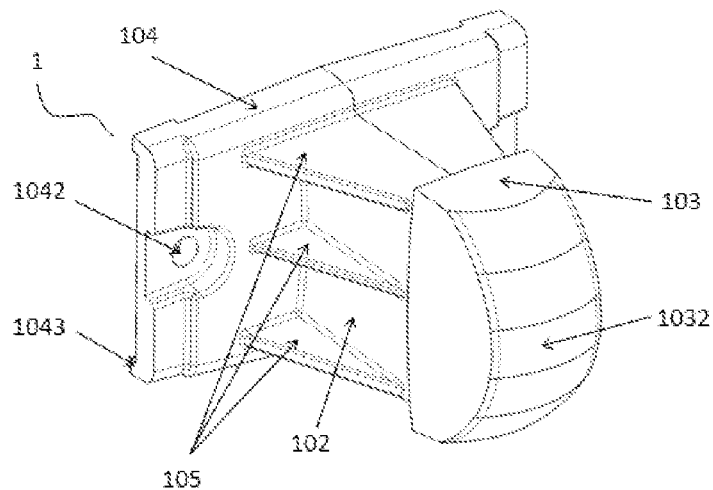
FIG. 1 is a first three-dimensional structural diagram of a first specific embodiment of a vehicle light optical element.
Figure 2:
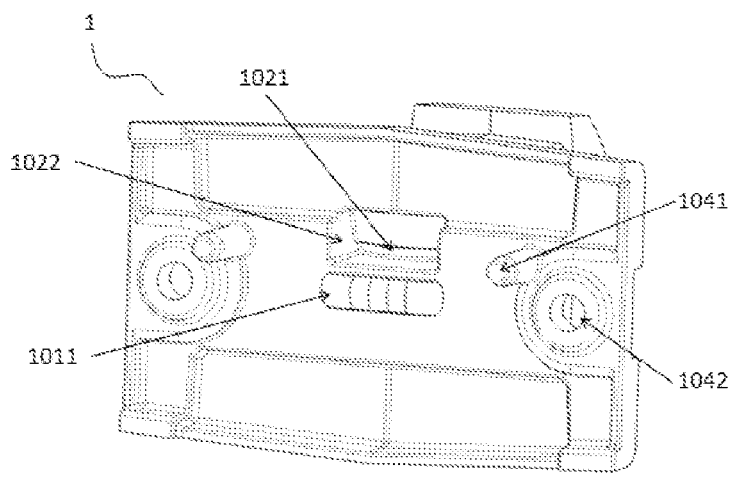
FIG. 2 is a second three-dimensional structural diagram of the first specific embodiment of the vehicle light optical element.
Figure 3:
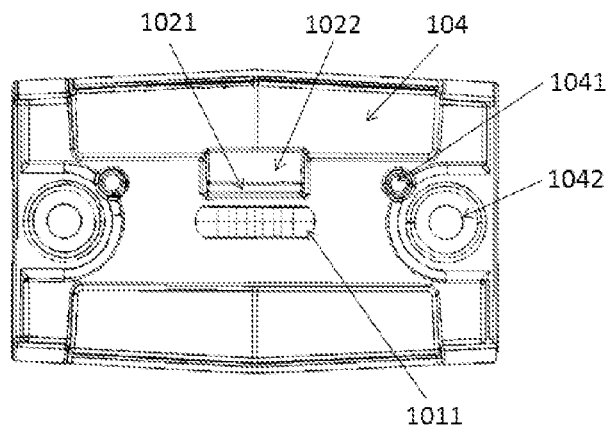
FIG. 3 is a rear-view structural diagram of the first specific embodiment of the vehicle light optical element.
Figure 4:
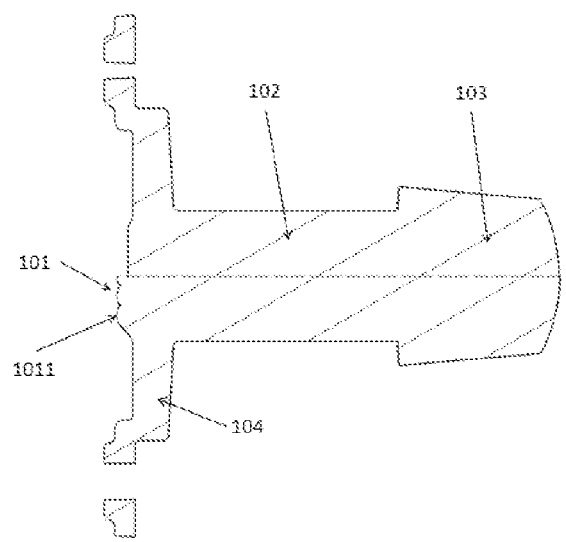
FIG. 4 is a transverse sectional diagram of the first specific embodiment of the vehicle light optical element.
Figure 5:
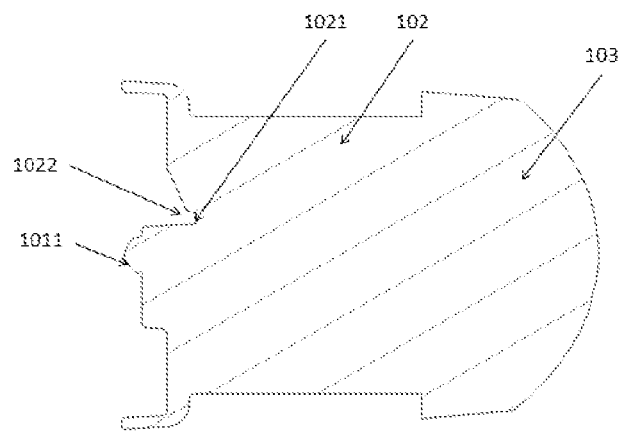
FIG. 5 is a longitudinal sectional diagram of the first specific embodiment of the vehicle light optical element.
Figure 6:
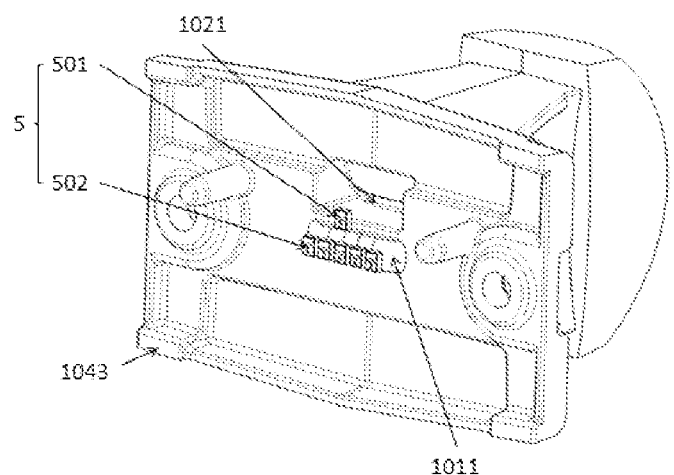
FIG. 6 is a structural diagram of the vehicle light optical element of the first specific embodiment and a light source.

| | Brief Description of the Symbols: |
|---|---|
| 1. | vehicle light optical element |
| 101. | light incident portion |
| 1011. | high-beam light incident structure |
| 102. | transmission portion |
| 1021. | illuminating light incident structure |
| 1022. | concave cavity |
| 1023. | light passing part |
| 1024. | light-shielding structure |
| 103. | light emitting portion |
| 1032. | light emitting surface |
| 104. | mounting portion |
| 1041. | positioning structure |
| 1042. | vehicle light optical element mounting hole |
| 1043. | mounting leg |
| 105. | reinforcing rib structure |
| 2. | fixing frame |
| 3. | radiator |
| 4. | circuit board |
| 5. | light source |
| 501. | illuminating light source |
| 502. | high-beam light source |
| 6. | ball head screw assembly |
| 601. | ball head screw |
| 6011. | ball head portion |
| 6012. | screw |
| 602. | ball head nut |
| 6021. | annular body |
| 6022. | elastic clamping piece |
| 6023. | elastic clamping leg |
| 6024. | reinforcing rib structure |
| 6025. | ball head nut cavity |
| 6026. | clamping groove |
| 7. | light body |
| 8. | auxiliary illuminating light shape |
| 9. | low-beam light shape upper area |
| 10. | low-beam light shape lower area |
| 11. | fastening screw |

DETAILED DESCRIPTION OF THE EMBODIMENTS

The specific embodiments of the present disclosure will be described in detail below with reference to the accompanying drawings. It should be appreciated that the specific embodiments described here are only used for illustrating and explaining the present disclosure, instead of limiting the present disclosure.

First of all, it should be noted that some orientation words involved in the following description to clearly illustrate the technical solution of the present disclosure, such as "front", "rear", "left", "right", have meanings as obtained by analogy based on the orientation indicated by a light transmission direction. For example, using a vehicle light optical element as an example, an end of the vehicle light optical element close to a high-beam light source is rear, and an end away from the high-beam light source is front; it may also be understood that an end of the vehicle light optical element where a light incident portion is located is rear, and an end where a light emitting portion is located is front. With respect to the front and rear directions of the vehicle light optical element, directions represented by left and right sides of the vehicle light optical element are left and right directions.

It should also be noted that an optical axis refers to a virtual straight line extending along the front-rear direction of the vehicle light optical element and passing through a focal point of the light emitting portion, and the light transmission direction is defined as a direction along the optical axis and pointing to the light emitting portion 103 from the light incident portion 101. A lengthwise section is defined as a section obtained by cutting the vehicle light optical element by a plane perpendicular to the optical axis; a longitudinal section is defined as a section obtained by cutting the vehicle light optical element by a vertical plane parallel to the optical axis; and a transverse section is defined as a section obtained by cutting the vehicle light optical element by a horizontal plane parallel to the optical axis.

In the description of the present disclosure, it should be noted that the terms "installation" and "connection" should be interpreted in a broad sense unless otherwise clearly specified and defined. For example, it may be a fixed connection, a detachable connection, or an integral connection; it may be a direct connection, or an indirect connection through an intermediate medium, and it may also be a communication within two elements or an interaction relationship between two elements. For those of ordinary skill in the art, the specific meanings of the above terms in the present disclosure may be understood according to specific circumstances.

As shown in FIGS. 1 to 5, and FIGS. 33 to 37, as a specific structural form of the present disclosure, the present disclosure provides a vehicle light optical element 1, which includes a light incident portion 101, a transmission portion 102, and a light emitting portion 103 successively from rear to front, wherein the light incident portion 101 includes a illuminating light incident structure 1021 and at least one high-beam light incident structure 1011, the illuminating light incident structure 1021 including a illuminating light incident surface, which is adapted to receive auxiliary illuminating light during low-beam illumination, and the auxiliary illuminating light is transmitted to the light emitting portion 103 through the transmission portion 102 and projected to form an auxiliary illuminating light shape; and the high-beam light incident structure 1011 can receive high-beam illuminating light, which is transmitted through the transmission portion 102 to the light emitting portion 103 and projected to form a high-beam light shape. The auxiliary illuminating light is light emitted by the illuminating light source 501 described below, and the high-beam illuminating light is light emitted by the high-beam light source 502 described below.

In a low beam illumination mode, the illuminating light incident structure 1021 receives auxiliary illuminating light, to ensure that the vehicle light optical element 1 is emitting light when the vehicle light is in the low-beam illumination mode, so that the appearance of the vehicle light is more beautiful; and in a high-beam illumination mode, the high-beam light incident structure 1011 receives high-beam illuminating light for high-beam illumination, and the illuminating light incident structure 1021 may or may not receive auxiliary illuminating light. Of course, after the auxiliary illuminating light is emergent from the light emitting portion 103, its projection area may be located in a low-beam light shape area of the vehicle light, or it may also be located in an area outside the low-beam light shape area of the vehicle light, as long as its brightness does not influence the low-beam illumination effect.

As shown in FIGS. 1 to 5, as a first optional structural form of the above-mentioned specific structural form, the light incident portion 101 has a concave cavity 1022 recessed toward a front end, and the illuminating light incident surface of the illuminating light incident structure 1021 is provided at the front end of the concave cavity 1022.

Figure 22:
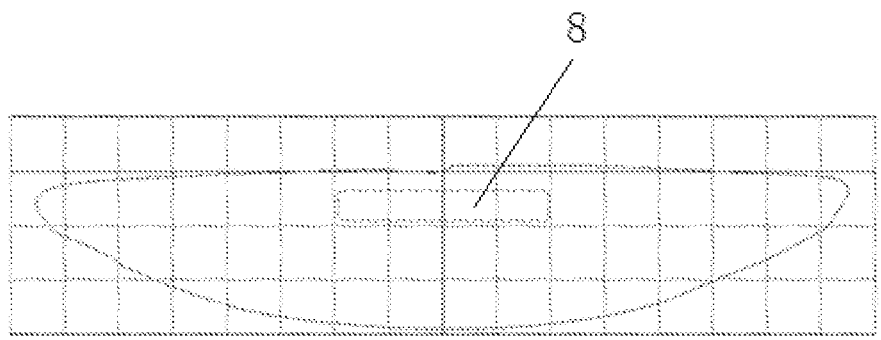
FIG. 22 is a schematic diagram of the position of a light shape of a illuminating light source.

As shown in FIG. 22, a projection area of light entering from the illuminating light incident surface of the illuminating light incident structure 1021 and projected by the light emitting portion 103, on a light-match screen is in the low-beam light shape area below a horizontal axis of the light-match screen. Therefore, the illuminating light incident structure 1021 is arranged above the high-beam light incident structure 1011, and the auxiliary illuminating light shape 8 formed via the illuminating light incident structure 1021 can be superimposed with the low-beam light shape below a horizontal axis, and the illuminance requirement of the light shape after superimposition is close to that of the low-beam light shape before superposition. It can be seen that the illuminance requirement of the auxiliary illuminating light received by the illuminating light incident structure 1021 is lower. To achieve the purpose, the light incident portion 101 is provided with the concave cavity 1022 recessed forward, and the illuminating light incident surface may be provided on a front end face of the concave cavity 1022 to increase the distance from a corresponding light source, so that the brightness of the light entering the illuminating light incident structure 1021 decreases after emergent from the light emitting portion 103.

As shown in FIGS. 33 to 37, as a second optional structural form of the above-mentioned specific structural form, the light incident portion 101 includes a illuminating light incident structure 1021 and at least one high-beam light incident structure 1011, wherein the illuminating light incident structure 1021 is a planar surface, an arc-shaped cylindrical body protruding rearward, a hemisphere protruding rearward, or a light-concentrating structure; the arc-shaped cylindrical body protruding rearward extends in the left-right direction or up-down direction; and the illuminating light incident structure 1021 is adapted to receive auxiliary illuminating light during low-beam illumination. To achieve the light emergent requirement, the illuminating light incident structure 1021 is generally arranged above the high-beam light incident structure 1011, but according to the illumination requirement, the illuminating light incident structure 1021 may also be arranged at other positions.

Figure 38:
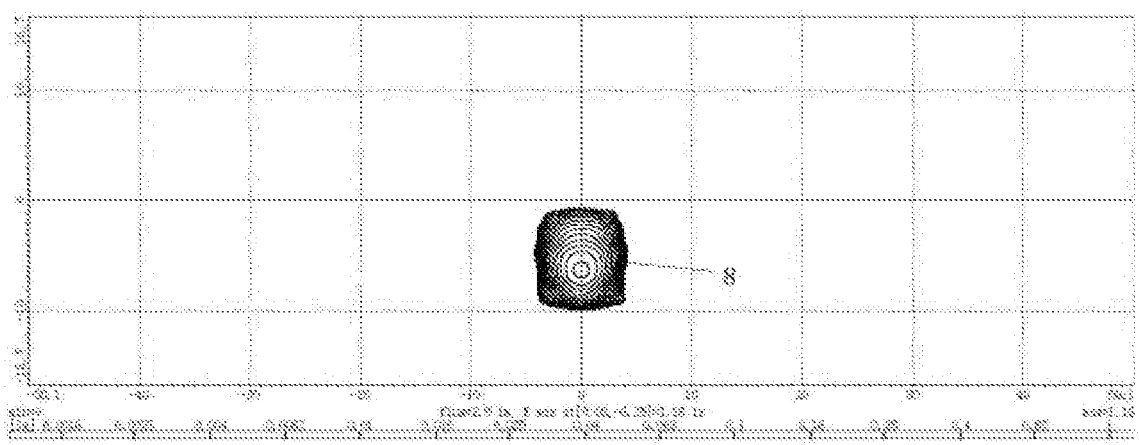
FIG. 38 is a schematic diagram of a light shape of a illuminating light source in FIG. 37 on a light-match screen.

Similarly, as shown in FIG. 38, in the low-beam illumination mode of the vehicle, a projection area of light entering from the illuminating light incident structure 1021 and projected by the light emitting portion 103, on the light-match screen is in the low-beam light shape area below the horizontal axis of the light-match screen, that is, the auxiliary illuminating light shape 8 may be located below the horizontal axis in FIG. 39, preferably located just in a low beam light shape lower area 10. Of course, the auxiliary illuminating light shape 8 may also be located in a low-beam light shape upper area 9, or in an area outside the low-beam light shape area, that is, the auxiliary illuminating light 8 emergent through the vehicle light optical element 1 may be irradiated to the upper front direction, the left side or the right side of the vehicle or other area that does not influence the low-beam illumination. The brightness of the auxiliary illuminating light shape 8 is low, and specifically may be determined according to the brightness of the low-beam light shape and related illuminating requirements to ensure that the brightness of the auxiliary illuminating light shape 8 does not influence the illumination intensity and uniformity of the low-beam light shape of the vehicle, nor influence other vehicles nearby.

To improve the light utilization rate of the above-mentioned vehicle light optical element 1, as a preferred structural form, the area of a lengthwise section of the transmission portion 102 gradually increases along a light transmission direction, that is, the area of the lengthwise section of the transmission portion 102 gradually increases from an end close to the light incident portion 101 to an end close to the light emitting portion 103. That is to say, at least one pair of two pairs of opposite side faces other than two end faces of the transmission portion 102 are trapezoids that gradually expand along the light transmission direction. With this structure, light received by the light incident portion 101 can be transmitted to the light emitting portion 103 via the transmission portion 102 and emergent, as much as possible, thereby improving the light utilization rate.

Further, to reduce the phenomenon that light is directly emergent from the side faces of the transmission portion 102 or is reflected by the side faces of the transmission portion 102 and then emergent from the light emitting portion 103 to form much stray light, thereby influencing optical properties of the light shape of the vehicle light, as a more preferred structural form, an extinction coating or extinction contours may be provided on peripheral side faces of the transmission portion 102. The extinction coating may reduce the reflection and transmission of light from the side faces of the transmission portion 102, and the extinction coating may be a coated matte black paint, or the surface of the transmission portion 102 may be provided with a leather texture and coated with a black opaque coating, such as a black bright paint. The extinction contours may be a leather texture or extinction teeth, and may also reduce part of the stray light.

Alternatively, as another more preferred structural form, portions of the left and right side faces of the transmission portion 102 close to the light incident portion 101 are parallel to the optical axis and extend toward the light emitting portion 103, and portions of the left and right side faces of the transmission portion 102 close to the light emitting portion 103 gradually draw closer to the optical axis while extending toward the light emitting portion 103, to form a low-reflectivity structure, so that the incident angle of the light incident on the left and right side faces of the transmission portion 102 is small, and the left and right side faces of the transmission portion 102 have a very low reflectivity and a very high refractive index, thereby effectively reducing the stray light formed by the light incident on the left and right side faces of the transmission portion 102 and reflected to a light emitting surface 1032 of the light emitting portion 103. However, this structure cannot effectively eliminate the stray light refracted to the outside by the side faces of the transmission portion 102. A light-shielding structure 1024 may be provided on the peripheral side faces of the transmission portion 102 to prevent the light from being irradiated to the outside. The light-shielding structure 1024 may be integrally formed with the transmission portion 102 by double-shot molding, and may also be formed separately from the transmission portion 102. The light-shielding structure 1024 may be a black plastic light-shielding layer, a black silica gel light-shielding layer or a black rubber light-shielding layer.

To reduce the stray light formed by the light emergent from the side faces of the light emitting portion 103 or refracted after being reflected by the side faces of the light emitting portion 103, as another preferred structural form, the light emitting surface 1032 of the light emitting portion 103 is a curved surface protruding forward; the width in a left-right direction of an end of the light emitting portion 103 connected with the transmission portion 102 is greater than the width in the left-right direction of an end of the transmission portion 102 connected with the light emitting portion 103; and the height in an up-down direction of the end of the light emitting portion 103 connected with the transmission portion 102 is greater than the height in the up-down direction of the end of the transmission portion 102 connected with the light emitting portion 103. With this structure, more of the light entering the light emitting portion 103 through the transmission portion 102 can be irradiated to the light emitting surface 1032 of the light emitting portion 103 and projected by the light emitting surface 1032 to form an illuminating light shape, thereby reducing the amount of light irradiated from the transmission portion 102 to the side faces of the light emitting portion 103, and the incident angle of the light irradiated to the side faces of the light emitting portion 103 is larger, and sufficiently larger than the critical angle of total reflection to cause total reflection on the light emitting surface 1032 of the light emitting portion 103.

Further, as another more preferred structural form, the upper, lower, left and right side faces of the light emitting portion 103 gradually draw closer to the optical axis along the light transmission direction to form planar surfaces inclined to the optical axis. The inclined structure can further increase the incident angle, formed on the light emitting surface 1032, of the light reflected by the side faces of the light emitting portion 103 to the light emitting surface 1032, and ensure that the incident angle of more light exceeds the critical angle of total reflection to cause total reflection. Although this inclined structure also reduces the incident angle of the light irradiated from the light incident portion 101 to the side faces of the light emitting portion 103, it is not enough to make the incident angle of this part of light smaller than the critical angle of total reflection, and thus the light irradiated from the light incident portion 101 to the side faces of the light emitting portion 103 is not obstructed from total reflection.

As shown in FIGS. 1 to 8, as a first optional structural form of the above-mentioned preferred structural form, the upper, lower, left and right side faces of the transmission portion 102 are rectangles extending in the light transmission direction, and the four side faces are provided with an extinction coating; the light emitting surface 1032 of the light emitting portion 103 is a curved surface protruding forward; the width in the left-right direction of the end of the light emitting portion 103 connected with the transmission portion 102 is greater than the width in the left-right direction of the end of the transmission portion 102 connected with the light emitting portion 103; the height in the up-down direction of the end of the light emitting portion 103 connected with the transmission portion 102 is greater than the height in the up-down direction of the end of the transmission portion 102 connected with the light emitting portion 103; and the upper, lower, left, and right side faces of the light emitting portion 103 gradually draw closer to the optical axis along the light transmission direction. This optional structural form can achieve that more of the light entering the light emitting portion 103 from the transmission portion 102 can be irradiated to the light emitting surface 1032 of the light emitting portion 103, and more of the light irradiated from the transmission portion 102 to the side faces of the light emitting portion 103 can undergo total reflection on the light emitting surface 1032 to reduce stray light.

Figure 7:
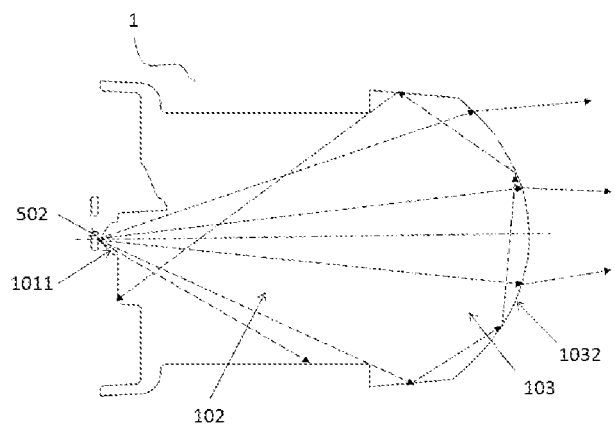
FIG. 7 is a ray diagram of a longitudinal section of FIG. 6.
Figure 8:
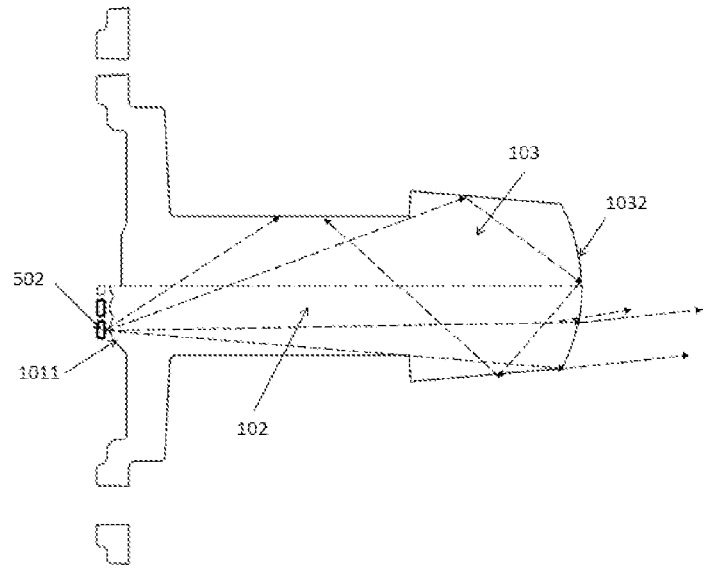
FIG. 8 is a ray diagram of a transverse section of FIG. 6.
Figure 9:
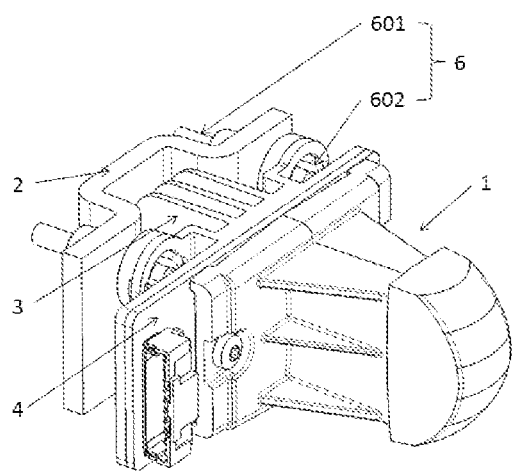
FIG. 9 is a first three-dimensional structural diagram of a vehicle light module including the vehicle light optical element of the first specific embodiment.
Figure 10:
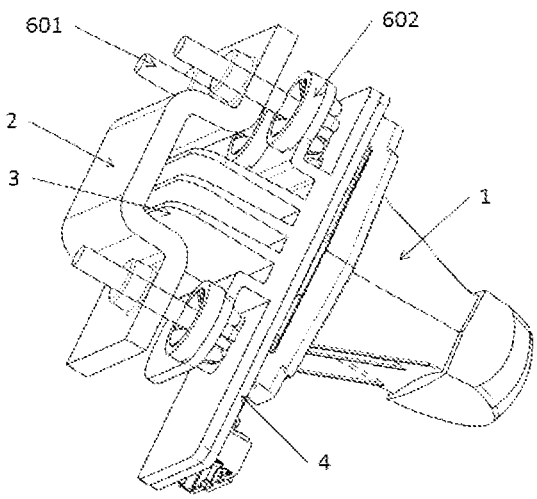
FIG. 10 is a second three-dimensional structural diagram of the vehicle light module including the vehicle light optical element of the first specific embodiment.
Figure 11:
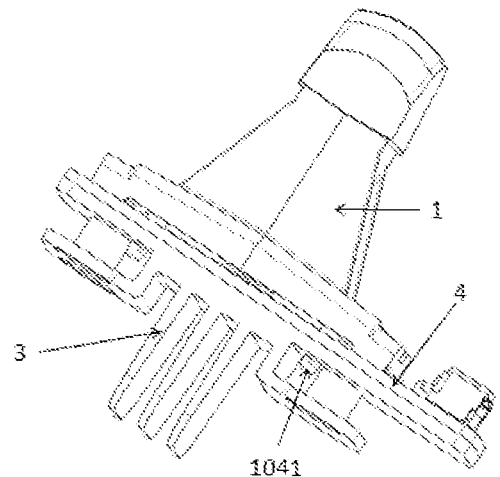
FIG. 11 is a first assembly diagram of the vehicle light optical element in the first specific embodiment, a circuit board and a radiator.
Figure 12:
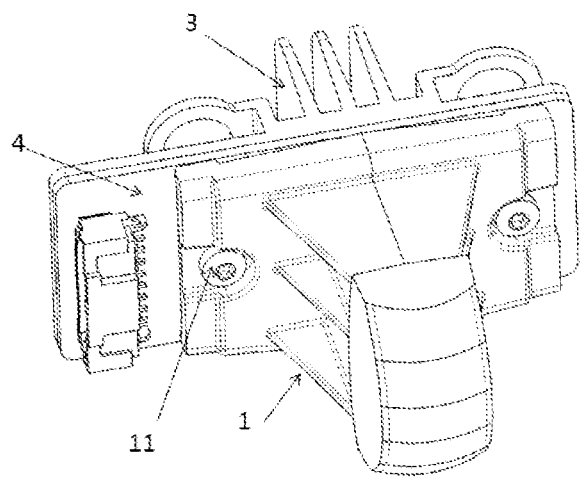
FIG. 12 is a second assembly diagram of the vehicle light optical element in the first specific embodiment, the circuit board and the radiator.
Figure 13:
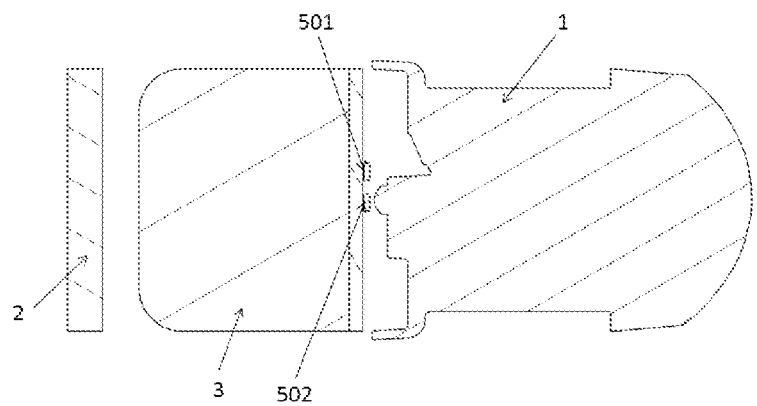
FIG. 13 is a longitudinal sectional diagram of FIG. 9.
Figure 14:
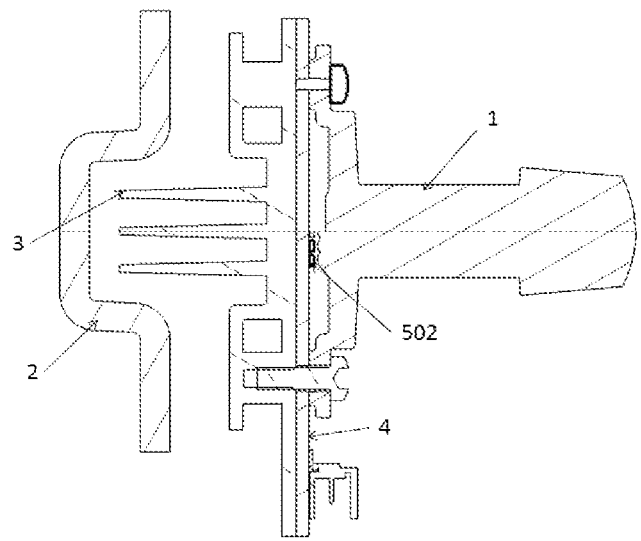
FIG. 14 is a transverse sectional diagram of FIG. 9.
Figure 15:
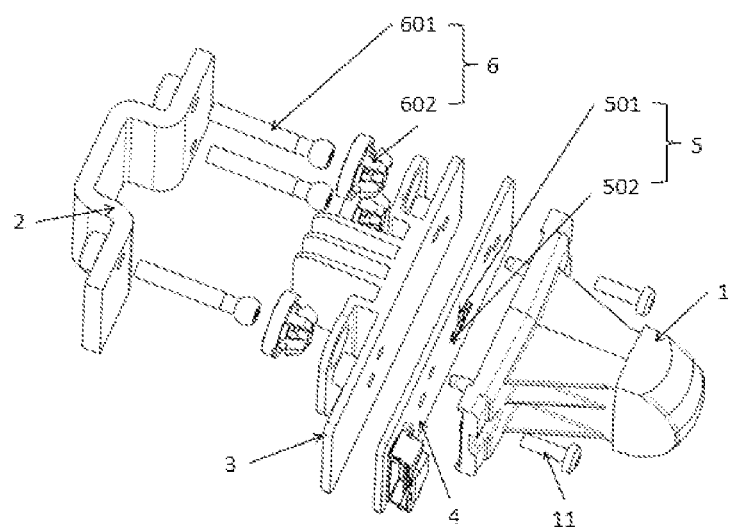
FIG. 15 is an exploded view of FIG. 9.

FIGS. 7 and 8 show schematic diagrams of a part of an optical path of a primary optical element 1 of the optional structural form. It can be seen from the figures that light irradiated to a side face of the transmission portion 102 is absorbed by the side face provided with an extinction coating, and light irradiated to a side face of the light emitting portion 103 is totally reflected to the light emitting surface 1032, then totally reflected from the light emitting surface 1032 to an opposite side face of the light emitting portion 103, and finally reflected back to the transmission portion 102 from the side face. The primary optical element 1 of the optional structural form may reduce the light emergent directly from the side faces of the transmission portion 102 or emergent from the light emitting portion 103 after reflected by the side faces of the transmission portion 102, and the light emergent from the side faces of the light emitting portion 103 or refracted after reflected by the side faces of the light emitting portion 103, thereby reducing the generation of stray light.

Figure 25:
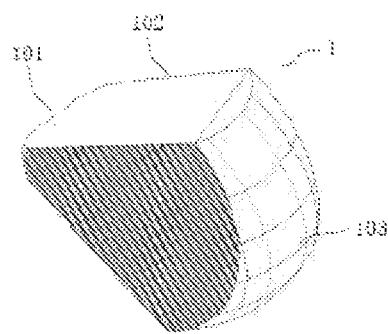
FIG. 25 is a first three-dimensional structural diagram of a second specific embodiment of the vehicle light optical element.
Figure 26:
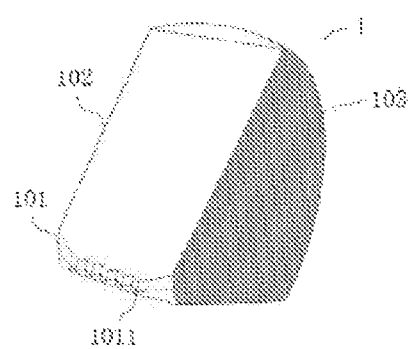
FIG. 26 is a second three-dimensional structural diagram of the second specific embodiment of the vehicle light optical element.
Figure 27:
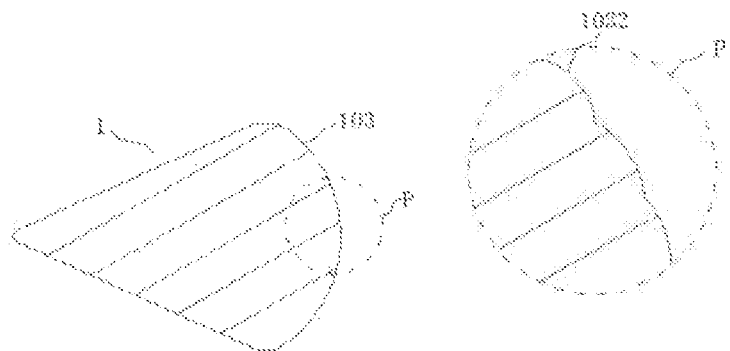
FIG. 27 is a longitudinal sectional view of the second specific embodiment of the vehicle light optical element and a partial enlarged view of a part P.
Figure 28:
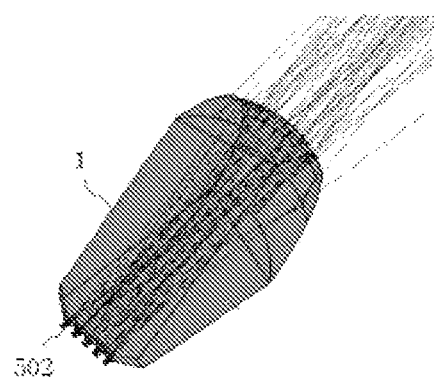
FIG. 28 is an optical path diagram of the vehicle light optical element of the second specific embodiment.

As shown in FIGS. 25 to 27, as a second optional structural form of the above-mentioned preferred structural form, the left and right side faces of the transmission portion 102 are trapezoids that gradually expand along the light transmission direction, that is, the height of the longitudinal section of the transmission portion 102 gradually increases from rear to front. As the light incident portion 101 corresponding to the transmission portion 102 includes a row of high-beam light incident structures 1011, a rear end of the vehicle light optical element 1 is small, and the left and right side faces of the transmission portion 102 are approximately quasi-triangular, so that light can be transmitted to the light emitting portion 103 through the transmission portion 102 and emergent, as much as possible, while maximally reducing the volume of the vehicle light optical element 1, thus improving the light utilization rate.

Optionally, at least one side face of the transmission portion 102 is provided with extinction contours, which are a leather texture or extinction teeth.

As shown in FIG. 25 and FIG. 26, at least one of the upper, lower, left and right side faces of the transmission portion 102 is provided with extinction contours. The extinction contours are a leather texture or extinction teeth, which make the side face of the transmission portion 102 rough or uneven, thereby reducing the light directly emergent from the side face of the transmission portion 102, or the stray light formed after reflection by the side face of the trans- mission portion 102, thereby improving the light-condensing ability of the transmission portion 102. The extinction teeth are a plurality of grooves recessed inwards from peripheral faces of the transmission portion 102.

Figure 30:
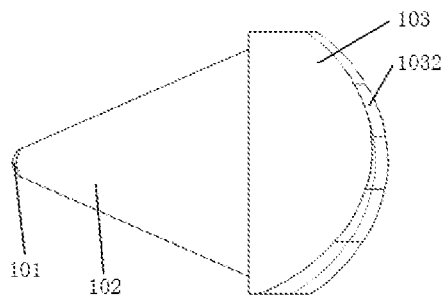
FIG. 30 is a side structural diagram of a third specific embodiment of the vehicle light optical element.
Figure 31:
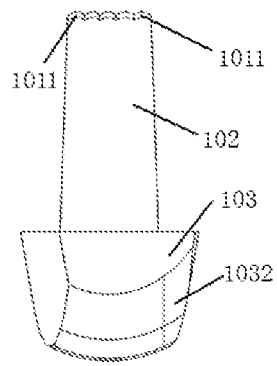
FIG. 31 is a top view of the third specific embodiment of the vehicle light optical element.

As shown in FIGS. 30 and 31, as a third optional structural form of the above-mentioned preferred structural form, the area of the lengthwise section of the transmission portion 102 gradually increases along the light transmission direction; specifically, the four side faces other than two end faces of the transmission portion 102 are all trapezoids that gradually expand along the light transmission direction; in other words, longitudinal and transverse sections of the transmission portion 102 are trapezoids that gradually expand along the light transmission direction; the light emitting surface 1032 of the light emitting portion 103 is a curved surface protruding forward; the width in the left-right direction of the end of the light emitting portion 103 connected with the transmission portion 102 is greater than the width in the left-right direction of the end of the transmission portion 102 connected with the light emitting portion 103; the height in the up-down direction of the end of the light emitting portion 103 connected with the transmission portion 102 is greater than the height in the up-down direction of the end of the transmission portion 102 connected with the light emitting portion 103; the upper, lower, left, and right side faces of the light emitting portion 103 gradually draw closer to the optical axis along the light transmission direction to form planar surfaces inclined to the optical axis; and an extinction coating is provided on the side faces of the transmission portion 102. The vehicle light optical element 1 of the optional structural form achieves a high light utilization rate and less stray light.

Figure 32:
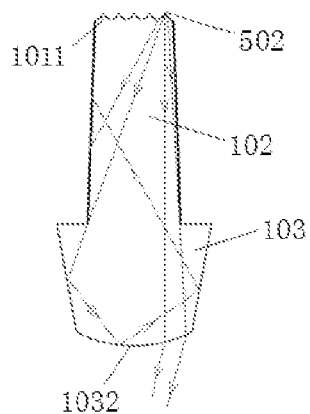
FIG. 32 is an optical path diagram including the vehicle light optical element of the third specific embodiment.
Figure 33:
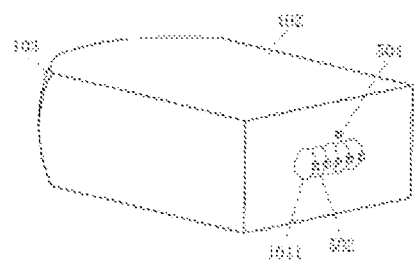
FIG. 33 is a first three-dimensional structural diagram of a fourth specific embodiment of the vehicle light optical element and a light source.
Figure 34:
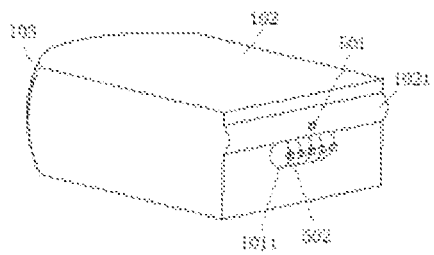
FIG. 34 is a second three-dimensional structure diagram of the fourth specific embodiment of the vehicle light optical element and a light source.
Figure 35:
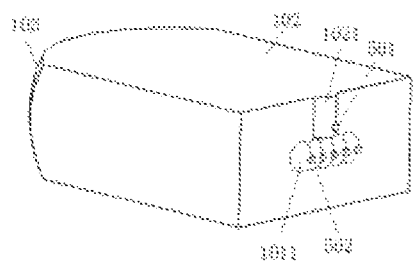
FIG. 35 is a third three-dimensional structure diagram of the fourth specific embodiment of the vehicle light optical element and a light source.
Figure 36:
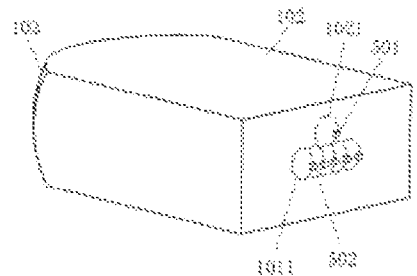
FIG. 36 is a fourth three-dimensional structure diagram of the fourth specific embodiment of the vehicle light optical element and a light source.
Figure 37:
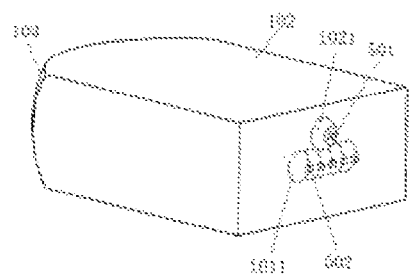
FIG. 37 is a fifth three-dimensional structure diagram of the fourth specific embodiment of the vehicle light optical element and a light source.

FIG. 32 shows a schematic diagram of a part of an optical path of a transverse section of the primary optical element 1 of the optional structural form. It can be seen from the figure that using the high-beam light source 502 located on the far left as an example, a part of the light emitted by the light source is directly irradiated to the light emitting surface 1032 of the light emitting portion 103, and is projected by the light emitting surface 1032 of the light emitting portion 103 to form a vehicle light light shape; a part of the light is irradiated to the side faces of the transmission portion 102 and is cut off by the side faces of the transmission portion 102 provided with an extinction coating, and is not emergent or reflected from the side faces of the transmission portion 102; and a third part of the light is irradiated to the right side face of the light emitting portion 103 and may be totally reflected to the light emitting surface 1032 of the light emitting portion 103, and is totally reflected by the light emitting surface 1032 of the light emitting portion 103 to the left side face of the light emitting portion 103, then totally reflected by the left side face of the light emitting portion 103 to the right side face of the transmission portion 102 and cut off there.

Figure 40:
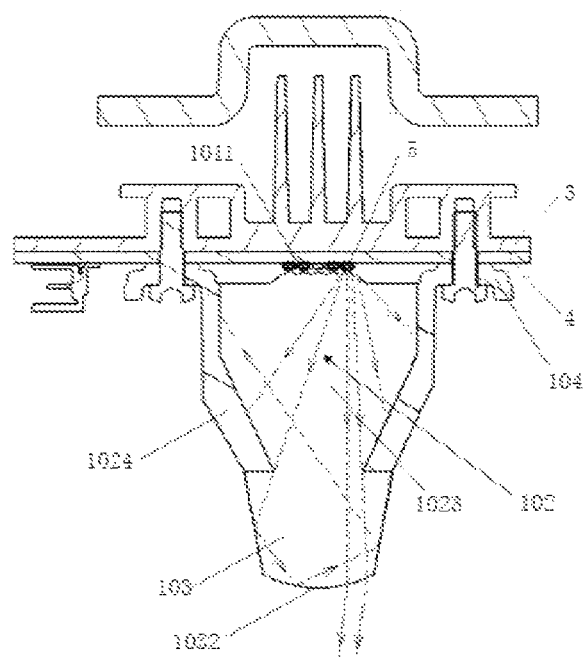
FIG. 40 is a first sectional view of a vehicle light module including the vehicle light optical element of a fifth specific embodiment.
Figure 41:
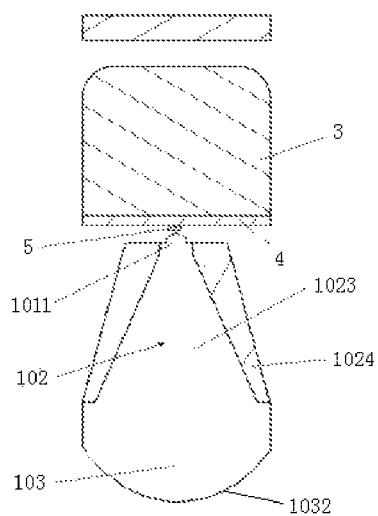
FIG. 41 is a second sectional view of the vehicle light module including the vehicle light optical element of the fifth specific embodiment.
Figure 42:
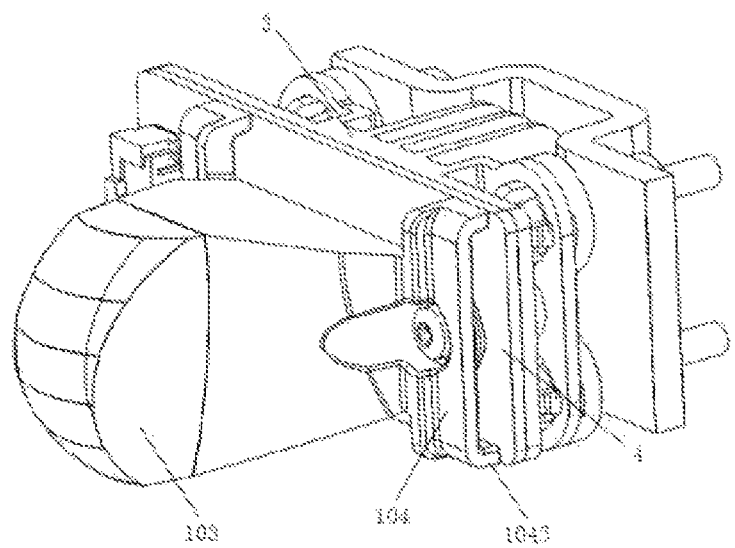
FIG. 42 is a three-dimensional structural diagram of the vehicle light module including the vehicle light optical element of the fifth specific embodiment.
Figure 43:
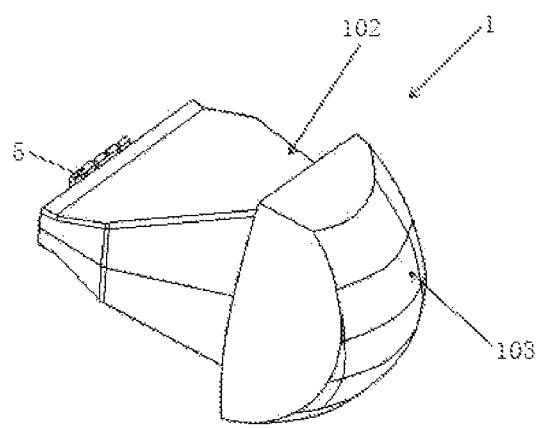
FIG. 43 is a first three-dimensional structural diagram of a sixth specific embodiment of the vehicle light optical element and a light source.
Figure 44:
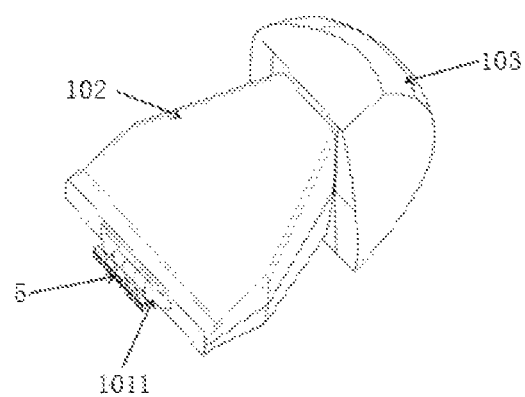
FIG. 44 is a second three-dimensional structural diagram of the sixth specific embodiment of the vehicle light optical element and a light source.

As shown in FIGS. 40 and 41, as a fourth optional structural form of the above-mentioned preferred structural form, an outer peripheral portion of the transmission portion 102 is provided with a light-shielding structure 1024, and the transmission portion 102 is made of high-transmittance material, such as transparent plastic or silica gel, for transmitting light introduced by the light incident portion 101 to the light emitting portion 103; and the light-shielding structure 1024 is a light-shielding structure made of a black PC material, for absorbing light irradiated to the light-shielding structure 1024 and preventing the light in the transmission portion 102 from being emergent via the side faces thereof or being reflected by the side faces thereof to form stray light.

Portions of the left and right side faces of the transmission portion 102 close to the light incident portion 101 are parallel to the optical axis and extend toward the light emitting portion 103; portions of the left and right side faces of the transmission portion 102 close to the light emitting portion 103 gradually draw closer to the optical axis while extending toward the light emitting portion 103; and the upper and lower side faces of the transmission portion 102 gradually tilt away from the optical axis while extending from the light incident portion 101 toward the light emitting portion 103, so that more of the light introduced from the light incident portion 101 can be transmitted to the light emitting surface 1032 of the light emitting portion 103.

In this case, when the light is irradiated at the same angle to the portions of the transmission portion 102 close to the light emitting portion 103, a smaller incident angle can be formed. The smaller the incident angle of light entering the interface between the transmission portion 102 and the light-shielding structure 1024, the smaller the proportion of reflected light and the greater the proportion of refracted light, such that more light is refracted at the interface between the transmission portion 102 and the light-shielding structure 1024 and absorbed by the light-shielding structure 1024, and less light is reflected and enters the transmission portion 102 again and is emergent from the light emitting portion 103 to form stray light. Through processing by the low-reflectance structure, the reflectance of the interface between the transmission portion 102 and the light-shielding structure 1024 can easily reach a level below 20%, or even below 5%, thereby effectively suppressing the generation of stray light.

Furthermore, the light emitting surface 1032 of the light emitting portion 103 is a curved surface protruding forward; the width in the left-right direction of the end of the light emitting portion 103 connected with the transmission portion 102 is greater than the width in the left-right direction of the end of the transmission portion 102 connected with the light emitting portion 103; and the height in the up-down direction of the end of the light emitting portion 103 connected with the transmission portion 102 is greater than the height in the up-down direction of the end of the transmission portion 102 connected with the light emitting portion 103, thereby limiting the angle of light irradiated to the side faces of the light emitting portion 103, such that the incident angles formed by the light irradiated to the side faces of the light emitting portion 103 are all significantly greater than the critical angle of total reflection to cause total reflection, and the light is reflected to the light emitting surface 1032 of the light emitting portion 103; as the light emitting surface 1032 is a convex curved surface, more of light reflected from a side face of the light emitting portion 103 can be totally reflected on the light emitting surface 1032, reflected to an opposite side face of the light emitting portion 103, and then totally reflected from the side face to the transmission portion 102, and to the light-shielding structure 1024; as the light-shielding structure 1024 can absorb the incident light, and the reflectivity of the interface with the transmission portion 102 is very low, most of the reflected light is absorbed by the light-shielding structure 1024, and very little of the light can be reflected from the interface. Moreover, the part of reflected light that is then emergent from the light emitting portion 103 is even less, so that stray light can be substantially eliminated.

Further, the upper, lower, left and right side faces of the light emitting portion 103 gradually draw closer to the optical axis along the light transmission direction to form planar surfaces inclined to the optical axis. The inclined structure can further increase the incident angle, formed on the light emitting surface 1032, of the light reflected by the side faces of the light emitting portion 103 to the light emitting surface 1032, and ensure that the incident angle of more light exceeds the critical angle of total reflection to cause total reflection. Although this inclined structure also reduces the incident angle of the light irradiated from the light incident portion 101 to the side faces of the light emitting portion 103, it is not enough to make the incident angle of this part of light smaller than the critical angle of total reflection, and thus the light irradiated from the light incident portion 101 to the side faces of the light emitting portion 103 is not obstructed from total reflection.

As shown in FIGS. 43 to 46, as a fifth optional structural form of the above-mentioned preferred structural form, the left side and right side faces of the transmission portion 102 extend forward along the optical axis, and then draw closer to the optical axis, to form a low-reflectivity structure. The incident angles of light incident on the left side face and right side face of the transmission portion 102 are very small, so that the reflectivity of the left side face and the right side face of the transmission portion 102 is very low, which can effectively reduce stray light formed by the light irradiated to the left side face and right side face of the transmission portion 102 and reflected to the light emitting surface 1032 of the light emitting portion 103.

Figure 46:
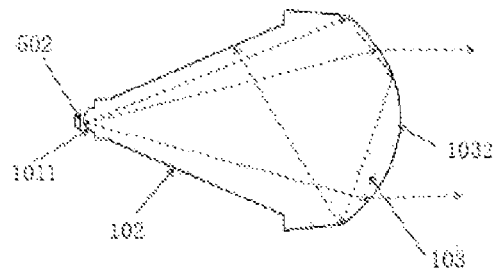
FIG. 46 is an optical path diagram of a longitudinal section of the sixth specific embodiment of the vehicle light optical element.
Figure 47:
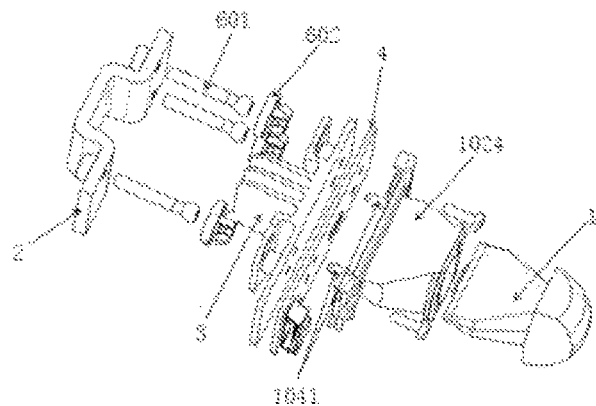
FIG. 47 is a first exploded view of a vehicle light module including the vehicle light optical element of FIG. 43.
Figure 48:
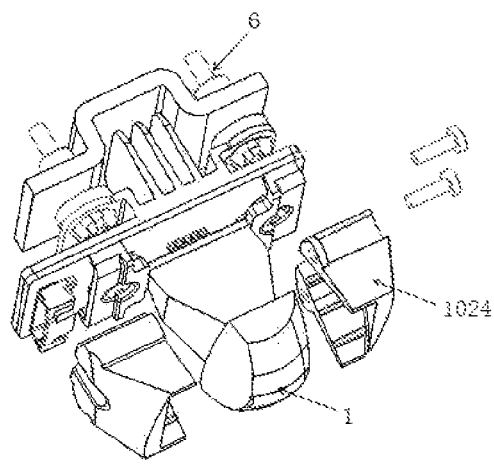
FIG. 48 is a second exploded view of the vehicle light module including the vehicle light optical element of FIG. 43.
Figure 49:
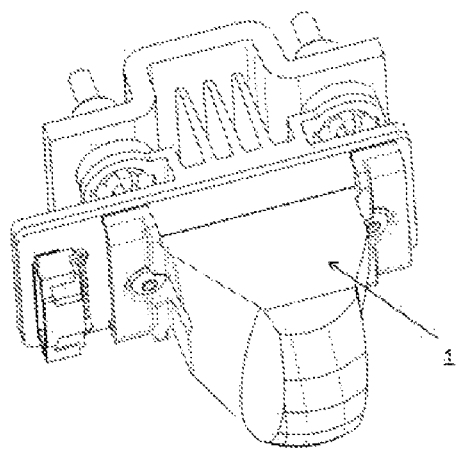
FIG. 49 is a three-dimensional structural view of the vehicle light module including the vehicle light optical element of FIG. 43.
Figure 50:
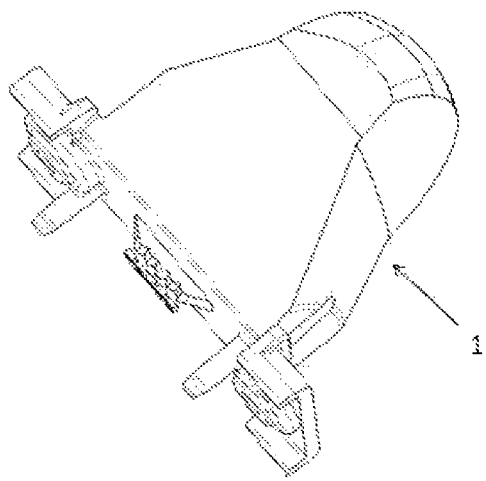
FIG. 50 is a three-dimensional structural view of the vehicle light optical element in FIG. 49 and a light source.

Furthermore, the upper and lower side faces of the transmission portion 102 gradually tilt away from the optical axis while extending from the light incident portion 101 toward the light emitting portion 103, that is, as shown in FIG. 46, the height of the longitudinal section of the transmission portion 102 gradually increases to form a quasi-triangular structure. In this case, the high-beam light incident structures 1011 are connected in a row along the left and right direction. Therefore, the size of the rear end of the vehicle light optical element 1 may be very small in the up-down direction, thereby saving material costs and further reducing the volume of the vehicle light optical element 1. With this structure, more of the light introduced from the light incident portion 101 may be transmitted to the light emitting surface 1032 of the light emitting portion 103, and almost no light is irradiated to the upper and lower side faces of the transmission portion 102, so there is almost no stray light reflected from the upper and lower side faces of the transmission portion 102 to the light emitting portion 103.

The light emitting surface 1032 of the light emitting portion 103 of the fifth optional structural form is a curved surface protruding forward; the width in the left-right direction of the end of the light emitting portion 103 connected with the transmission portion 102 is greater than the width in the left-right direction of the end of the transmission portion 102 connected with the light emitting portion 103; and the height in the up-down direction of the end of the light emitting portion 103 connected with the transmission portion 102 is greater than the height in the up-down direction of the end of the transmission portion 102 connected with the light emitting portion 103, thereby blocking part of the light irradiated to the peripheral side faces of the light emitting portion 103, so that the light irradiated to the peripheral side faces of the light emitting portion 103 can be totally reflected. Further, the peripheral side faces of the light emitting portion 103 gradually draw closer to the optical axis along the light transmission direction, so that the incident angle, formed on the light emitting surface 1032, of the light reflected by the side faces of the light emitting portion 103 to the light emitting surface 1032 is further increased, to ensure that the incident angle of more light exceeds the critical angle of total reflection to cause total reflection.

Figure 45:
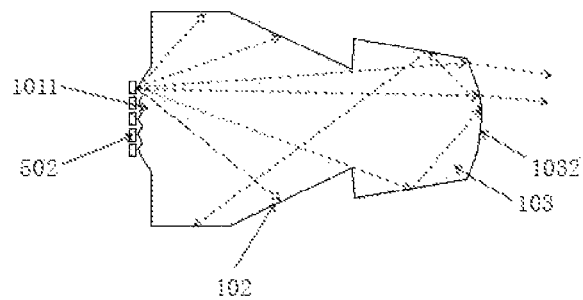
FIG. 45 is an optical path diagram of a transverse section of the sixth specific embodiment of the vehicle light optical element.

FIG. 45 shows a schematic diagram of an optical path of a transverse section of the above-mentioned fifth optional structural form. Most of the light from the high-beam light source 502 is directly emergent from the light emitting surface 1032 of the light emitting portion 103; a part of the light is irradiated to the left and right side faces of the transmission portion 102, and as the incident angle of the light incident on the left and right side faces of the transmission portion 102 is very small, the reflectivity of the left and right side faces is very low, and the light irradiated to the left and right side faces of the transmission portion 102 cannot be reflected into the light emitting portion 103; and a part of the light is irradiated to the side faces of the light emitting portion 103, and as the left (right) side face of the light emitting portion 103 is arranged obliquely, the light totally reflected by the side face to the light emitting surface 1032 can be totally reflected to the right (left) side face of the light emitting portion 103, and then totally reflected from the right (left) side face to the left (right) side face of the transmission portion 102, and as the reflectivity of the left and right side faces of the transmission portion 102 is very low, there is substantially no light reflected by the left and right side faces to the light emitting surface 1032 to form stray light.

FIG. 46 shows a schematic diagram of an optical path of a longitudinal section of the above-mentioned fifth optional structural form. Most of the light from the high-beam light source 502 is directly emergent from the light emitting surface 1032 of the light emitting portion 103, and a small part of the light is irradiated to the side faces of the light emitting portion 103. The upper (lower) side face of the light emitting portion 103 is arranged obliquely, so that the light totally reflected by the side face to the light emitting surface 1032 can be totally reflected to the lower (upper) side face of the light emitting portion 103, and then totally reflected from the lower (upper) side face to the upper (lower) side face of the transmission portion 102, and due to a very small incident angle, there is substantially no light reflected by the side face to the light emitting surface 103 to form stray light.

However, this structure cannot effectively eliminate the stray light refracted to the outside by the side faces of the transmission portion 102. A light-shielding structure 1024 may be provided on the peripheral side faces of the transmission portion 102 to prevent the light from being irradiated to the outside.

In any of the vehicle light optical elements of the above-mentioned five optional structural forms, a illuminating light incident structure 1021 may be added to achieve the technical effect that the vehicle light optical element 1 emits light when the vehicle light is in the low-beam illumination mode.

The light incident portion 101 of the vehicle light optical element 1 of the present application includes at least one high-beam light incident structure 1011, wherein the high-beam light incident structure 1011 is arranged in a matrix, and the high-beam light incident structure 1011 is provided in at least one row on an end face of the light incident portion 101, as shown in FIGS. 2, 31, 33 to 37, 40 and 44, an end of the high-beam light incident structure 1011 facing away from the light emitting portion 103 forms a light incident convex surface, that is, a light incident surface of the high-beam light incident structure 1011 is a curved surface protruding rearward. Of course, the high-beam light incident structure 1011 may also be other light-concentrating structure. According to the actual light emergent requirement, the number of the high-beam light incident structure 1011 may be increased or decreased. According to the actual illumination requirement, a single high-beam light incident structure, a row of a plurality of high-beam light incident structures, a plurality of rows of high-beam light incident structures, or a plurality of columns of high-beam light incident structures may be provided. The number and arrangement structure are set according to the actual need.

Optionally, the high-beam light incident structure 1011 is a light-condensing cup structure, and a light incident end of the light-condensing cup structure is a planar surface, or the bottom of the light-condensing cup structure is provided with a groove having a rearwardly protruding curved surface formed therein.

Optionally, as shown in FIG. 26, the high-beam light incident structure 1011 is a cone protruding rearward.

Here, whichever of the structural forms is adopted for the high-beam light incident structure 1011, its function meets the following two requirements: on the one hand, it can better converge and collimate the incident light; on the other hand, it can cooperate with the forwardly protruding light emitting surface 1032 to form a structure of a double-convex lens or similar to a double-convex lens, which can better collect and collimate the incident light and then project it forward, so that an ideal designed light shape can be formed.

The light emitting surface 1032 of the light emitting portion 103 of the vehicle light optical element 1 of the present application is a curved surface protruding toward the front end. Optionally, the light emitting surface 1032 may be provided with a light diffusion structure. As shown in FIGS. 1, 25, 27, 30, 42 and 44, the light diffusion structure is formed by splicing a plurality of block-shaped curved surfaces in grid distribution, and each block-shaped curved surface may be used for light divergence to expand an illumination area. Optionally, the light diffusion structure may also be formed by splicing a plurality of block-shaped planes in grid distribution, and may also be a plurality of strip-shaped convex structures or strip-shaped planar structures arranged along the left-right direction or the up-down direction. The various structural forms of the light diffusion structure of can diffuse the emergent light to the up-down and/or left-right direction to obtain a desired light shape.

Figure 29:
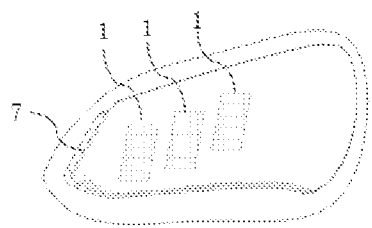
FIG. 29 is a structural diagram of a vehicle headlight including the vehicle light optical element of the second specific embodiment.

In the case where the light emergent requirement is met, according to different optical properties and a design surface of the vehicle light appearance, a forward projection of the light emitting surface 1032 may be in any suitable shape, which may be a rectangle placed vertically or horizontally, or a parallelogram, a circle or other special shape. For example, as shown in FIG. 29, the front projection of the light emitting surface 1032 is a parallelogram.

As can be seen in FIGS. 1 to 3, 4 to 15, 25 to 28, 30 to 37, and 40 to 50, the vehicle light optical element of the present disclosure may be understood as integration of a primary optical element and a secondary optical element of a traditional vehicle light module. This structural form can meet the illuminating requirement of the vehicle light, and achieves high optical precision and a small volume of the optical element, so that the space occupied by the vehicle light module can be reduced, and upper, lower, left, and right opening dimensions of the light emitting portion 103 may be very small, without influencing the light shape effect. For example, in a specific embodiment shown in FIG. 1, the dimension of at least one of the upper-lower and the left-right directions of the light emitting portion 103 is less than or equal to 30 mm, wherein a preferred dimension may be 25 mm, 20 mm, 15 mm, or 10 mm. The light emitting portion 103 shown in 1 has an upper-lower height of 20 mm and a left-right width of 10 mm, and has a small volume, but the light shape effect is not influenced.

A second aspect of the present disclosure further provides a vehicle light module, as shown in FIGS. 9 to 15, 40 to 42, and 47 to 50, the vehicle light module includes, successively from rear to front, a fixing frame 2, a radiator 3, a circuit board 4, a light source 5 arranged on a front end face of the circuit board 4, and the vehicle light optical element 1 of any one of the technical solutions described above, wherein the fixing frame 2 is fixedly connected with the vehicle light body 7; the fixing frame 2 and the radiator 3 are connected through at least three ball head screw assemblies 6; and the vehicle light optical element 1 is fixedly connected with the circuit board 4 and the radiator 3.

As shown in FIGS. 10, 15, 40, 42, and 47 to 50, three ball head screw assemblies 6 connect the fixing frame 2 and the radiator 3 together. The vehicle light optical element 1 uses fastening screws 11 to fixedly connect the vehicle light optical element 1 to the circuit board 4 and the radiator 3. The light optical element 1 and the circuit board 4 are provided with vehicle light optical element mounting holes 1042 and circuit board mounting holes for the fastening screws 11 to pass through successively. Correspondingly, the radiator 3 is provided with threaded connection holes capable of threaded connecting with the fastening screws 11.

As shown in FIGS. 17 to 21, each ball head screw assembly 6 includes a ball head screw 601 and a ball head nut 602, wherein the ball head screw 601 includes a ball head portion 6011 and a screw 6012 connected with the ball head portion 6011; and the ball head nut 602 includes an annular body 6021, an inner side of the annular body 6021 being provided with or integrally formed with four elastic clamping pieces 6022, and an end of the annular body 6021 being provided with or integrally formed with four elastic clamping legs 6023.

Optionally, the ball head nut 602 includes an annular body 6021, an inner side of the annular body 6021 being provided with or integrally formed with four elastic clamping pieces 6022, and an end of the annular body 6021 being provided with or integrally formed with two elastic clamping legs 6023 and a reinforcing rib structure 6024, the two elastic clamping legs 6023 being arranged oppositely, and the reinforcing rib structure 6024 being arranged between the two elastic clamping legs 6023.

The elastic clamping pieces 6022 and the elastic clamping legs 6023 enclose a ball head nut cavity 6025, and the ball head nut cavity 6025 is adapted to accommodate the ball head portion 6011; the elastic clamping pieces 6022 are capable of preventing the ball head portion 6011 from escaping from the ball head nut cavity 6025; and the elastic clamping legs 6023 are adapted for clamped connection with the radiator 3.

Figure 16:
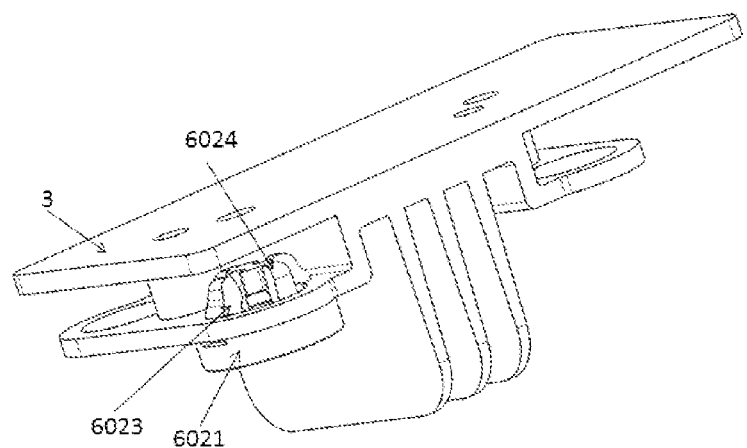
FIG. 16 is an installation structural diagram of a ball head nut and a radiator.
Figure 17:
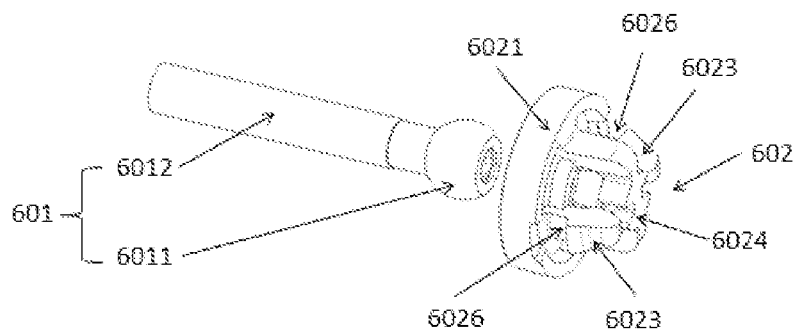
FIG. 17 is a structural diagram of a ball head assembly.
Figure 18:
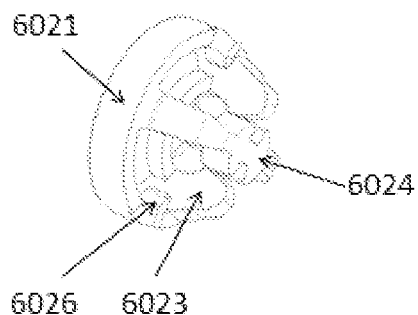
FIG. 18 is a first three-dimensional structural diagram of a specific embodiment of a ball head nut.
Figure 19:
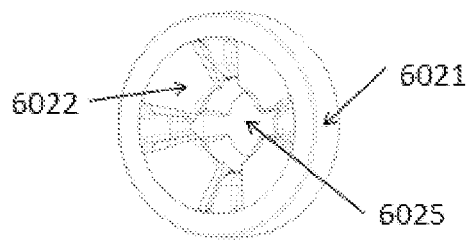
FIG. 19 is a second three-dimensional structural diagram of a specific embodiment of a ball head nut.
Figure 20:
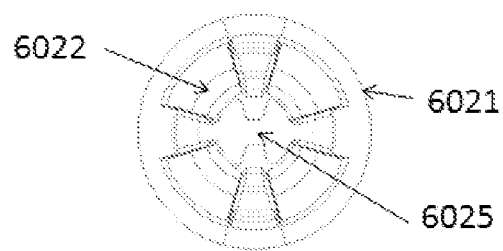
FIG. 20 is a rear-view structural diagram of a specific embodiment of a ball head nut.
Figure 21:
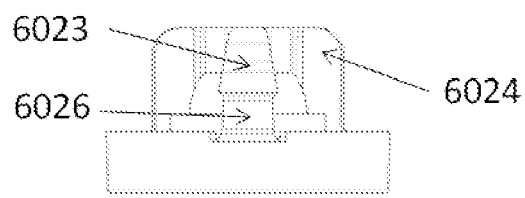
FIG. 21 is a side-view structural diagram of a specific embodiment of a ball head nut.

As shown in FIG. 16, the ball head nut 602 is inserted from a rear end of the radiator 3, and after clamping grooves 6026 on the elastic clamping legs 6023 are engaged with the radiator 3, the ball head nut 602 is fixed, and the ball head portion 6011 of the ball head screw 601 is inserted into the ball head nut cavity 6025; the elastic clamping pieces 6022 can prevent the ball head portion 6011 from escaping, thus connecting the ball head nut 602 and the ball head screw 601. As another optional embodiment of the ball head nut 602, two elastic clamping legs 6023 may be symmetrically arranged on the ball head nut 602, and a reinforcing rib structure 6024 may be provided between the two elastic clamping legs 6023. The two elastic clamping legs 6023 may be used for clamped connection between the ball head nut 602 and the radiator 3, and the reinforcing rib structure 6024 may increase the strength of the ball head nut 602 and prevent the ball head screw 601 from falling off during strong vibration.

The above-mentioned three ball head screw assemblies 6 are used for driving the vehicle light optical element 1 to swing in the up-down and left-right directions, so as to achieve up-down and left-right dimming of the light shape of the vehicle light. Specifically, a center connecting line between the ball head portions 6011 of two of the ball head screws 601 extends in the left-right direction, and a center connecting line between the ball head portions 6011 of one of the two ball head screws 601 and of the rest ball head screw 601 extend in the up-down direction.

As can be seen from FIGS. 9, 10, 15, 42, and 47 to 49, three sets of ball head screw assemblies 6 are provided in each of the three specific embodiments, wherein two sets of ball head screw assemblies 6 are respectively provided at a left side and a right side of the vehicle light optical element 1, and the ball centers of the ball head portions 6011 of the ball head screws 601 thereof are on a same horizontal line, and the ball center of the ball head portion 6011 of one of the ball head screws 601 and the ball center of the ball head portion 6011 of the ball head screw 601 of the third set of ball head screw assembly 6 are on a same vertical line, so that the three ball head screw assemblies 6 can form a relatively stable triangle.

The dimming principle of the three sets of ball head screw assemblies 6 is that the two sets of ball head screw assemblies 6 with the ball centers on the same horizontal line are fixed, and the ball head screw 601 of another set of ball head screw assembly 6 can be rotated to cause the set of ball head screw assembly 6 to move forward and rearward, so that the above-mentioned vehicle light optical element 1 rotates around the center connecting line between the ball head portions 6011 of the two sets of the ball head screw assemblies 6 whose ball centers are on the same horizontal line, as an axis, to achieve the up-down dimming of the vehicle light light shape; and the two sets of ball head screw assemblies 6 with the ball centers on the same vertical line are fixed, and the ball head screw 601 of the other set of ball head screw assembly 6 can be rotated to cause the set of ball head screw assembly 6 move forward and rearward, so that the above-mentioned vehicle light optical element 1 rotates around the center connecting line between the ball head portions 6011 of the two sets of the ball head screw assemblies 6 whose ball centers are on the same vertical line, as an axis, to achieve the left-right dimming of the vehicle light light shape.

As shown in FIG. 1, a rear end of the transmission portion 102 of the vehicle light optical element 1 is connected with a mounting portion 104, and lateral sides of the transmission portion 102 are provided with reinforcing rib structures 105 connected to the mounting portion 104 to increase the structural strength of the vehicle light optical element 1.

Preferably, as shown in FIGS. 2, 3, 11, 15 and 47, the mounting portion 104 is provided with positioning pins 1041. The radiator 3 and the circuit board 4 are both provided with positioning pin matching holes, which are adapted to cooperate with the positioning pins 1041 to connect the vehicle light optical element 1 to the radiator 3 and the circuit board 4. The positioning pins 1041 on the vehicle light optical element 1 can be inserted into the positioning pin matching holes formed in the circuit board 4 and the radiator 3 to position the vehicle light optical element 1, thereby improving the installation accuracy of the vehicle light optical element 1.

More preferably, mounting legs 1043 are further provided on a rear end face of the mounting portion 104. When the vehicle light optical element 1 is mounted to the radiator 3, the mounting legs 1043 are supported on the circuit board 4 to fix the position of the vehicle light optical element 1. The mounting legs 1043 achieves point-line combined support between the mounting portion 104 and the circuit board 3, and can avoid shaking caused by uneven contact surfaces in the case of surface contact support, thereby improving the stability of installation.

As shown in FIGS. 6 to 8 and 33 to 37, the light source 5 includes a illuminating light source 501 and a high-beam light source 502; and the illuminating light source 501 is arranged above the high-beam light source 502, and an auxiliary illuminating light shape is formed after light emitted by the illuminating light source 501 is projected by the vehicle light optical element 1. The illuminating light source 501 is a light source with adjustable brightness; the illuminating light source 501 is arranged corresponding to the illuminating light incident structure 1021, and the high-beam light source 502 is in one-to-one correspondence with the high-beam light incident structure 1011. In the low-beam illumination mode, the illuminating light source 501 is a normally-on light source, and a plurality of high-beam light sources 502 are arranged in a matrix, and are lit up in the high-beam illumination mode.

Figure 23:
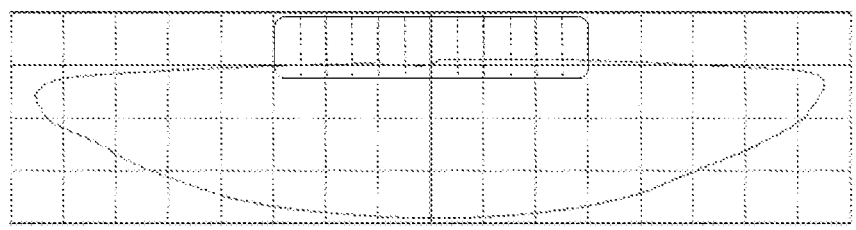
FIG. 23 is a schematic diagram of a light shape of a vehicle headlight.
Figure 24:
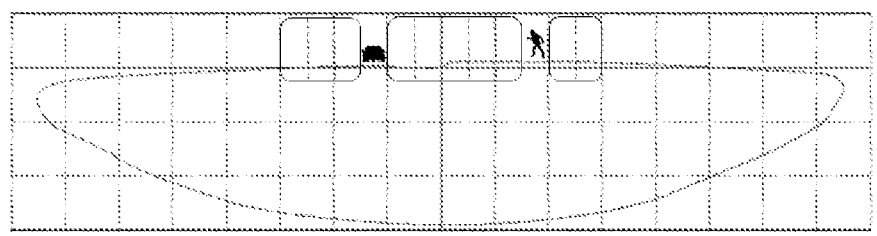
FIG. 24 is a schematic diagram of a light shape of an anti-glare dark area of a vehicle.

As shown in FIG. 22, an area of the auxiliary illuminating light shape 8 formed by light from the illuminating light source 501 projected by the above-mentioned vehicle light optical element 1 on the light-match screen is in the low-beam light shape area below the horizontal axis of the light-match screen. As the auxiliary illuminating light shape 8 can be superimposed with the low-beam light shape below the horizontal axis, the illuminance the light shape after superimposition should be close to that of the original low-beam light shape. The light-match screen in FIG. 23 shows the entire vehicle light light shape, including a high-beam light shape above, and a low-beam light shape below, which are superimposed together. The on and off of the high-beam light sources 502 can be independently controlled, and the vehicle light optical element 1 is used for dividing a high-beam illumination area into a number of illumination units equal to the number of high-beam light sources 502, and the brightness of each illumination unit is separately controlled by the corresponding high-beam light source 502. Here, the volume of the vehicle light optical element 1 is adaptively reduced with the decrease of the number of light sources 5. For example, in the vehicle light optical element 1 as shown in FIG. 25, the opening dimensions of the light emitting surface 1032 are about 20 mm high and about 10 mm wide, which are much smaller than lens opening dimensions of a current matrix headlight module, thus being adaptable to a richer variety of vehicle light appearances. In addition, the high-beam light incident structures 1011 may also be arranged in multiple rows along the up-down direction. In the case where each high-beam light incident structure 1011 is correspondingly installed with a high-beam light source 502, a matrix light shape in multiple rows may be formed in an illumination area of the vehicle light module. FIG. 24 illustrates an anti-glare function in high-beam illumination of the specific embodiment. When there is a vehicle or pedestrian in an opposite lane, the high-beam light source 502 of the corresponding illumination unit in the vehicle light module is extinguished, so that the corresponding illumination unit forms a dark area.

Figure 39:
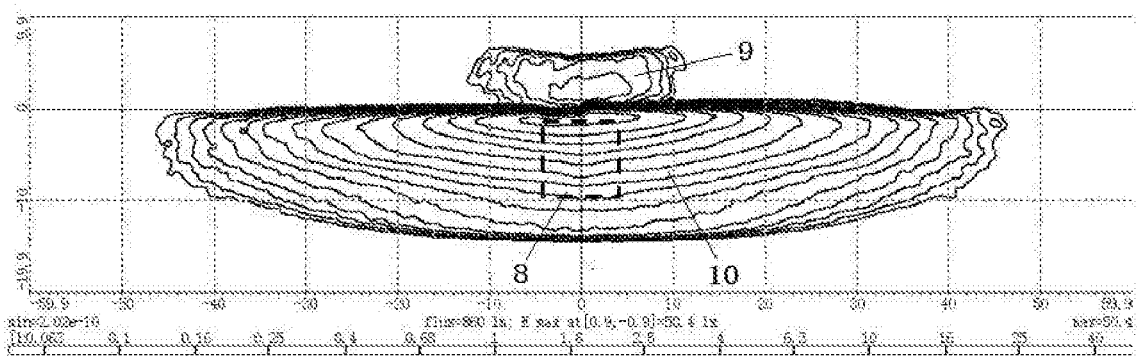
FIG. 39 is a schematic diagram of the light shape of the illuminating light source in FIG. 37 superimposed with a low beam light shape on the light-match screen.

As shown in FIGS. 38 and 39, in the low-beam illumination mode of the vehicle, the illuminating light source 501 forms the auxiliary illuminating light shape 8, which may be located below the horizontal axis in FIG. 39, and preferably located just below the low-beam light shape lower area 10. Of course, the auxiliary illuminating light shape 8 may also be located in an upper area 9 of the low-beam light shape, or an area outside the low-beam light shape area. That is, the light from the illuminating light source 501 emergent through the vehicle light optical element 1 may be irradiated toward areas that do not influence the low-beam illumination, such as the upper front, left and right sides of the vehicle. The brightness of the auxiliary illuminating light shape 8 is low, and may be specifically determined according to the brightness of the low-beam light shape and related illumination requirement, to ensure that the brightness of the auxiliary illuminating light shape 8 does not influence the illumination intensity and uniformity of the low-beam light shape of the vehicle, nor influence other vehicles nearby. The low-beam light shape lower area 10 is a low-beam light shape located below the horizontal axis, and the low-beam light shape upper area 9 is a low-beam III area light shape located above the horizontal axis.

A third aspect of the present disclosure further provides a vehicle headlight, including the vehicle light module according to any one of the technical solutions described above, wherein a plurality of vehicle light modules are provided, and the plurality of vehicle light modules are arranged in the vehicle headlight in an integrated or dispersed manner. As shown in FIG. 29, 3 vehicle light modules are provided in the vehicle light, and together form a matrix headlight. The illumination effect is shown in FIG. 24. When an obstacle such as other vehicle or a pedestrian appears on the driving route of the vehicle, the light source 502 corresponding to the illumination unit where the obstacle is located is turned off by adjusting the high-beam light shape of the vehicle headlight, so that the area where the illumination unit is located is darkened to prevent dazzling other road users, thus improving driving safety.

Optionally, a plurality of vehicle light modules are provided, and the vehicle light modules are distributed in a longitudinal, transverse or oblique arrangement in the vehicle headlight. The specific arrangement may be as shown in FIG. 29, and other arrangement may also be adopted.

A fourth aspect of the present disclosure further provides a vehicle, including the vehicle headlight according to the technical solution described above.

It can be seen from the above description that the vehicle light optical element 1 of the present disclosure includes a light incident portion 101, a transmission portion 102, and a light emitting portion 103 successively from rear to front, wherein the light incident portion 101 includes a illuminating light incident structure 1021 and at least one high-beam light incident structure 1011, the illuminating light incident structure 1021 including a illuminating light incident surface, which is adapted to receive auxiliary illuminating light during low-beam illumination, and the auxiliary illuminating light is transmitted to the light emitting portion 103 through the transmission portion 102 and projected to form an auxiliary illuminating light shape; and the high-beam light incident structure 1011 can receive high-beam illuminating light, which is transmitted through the transmission portion 102 to the light emitting portion 103 and projected to form a high-beam light shape. With the illuminating light incident structure 1021, the vehicle light optical element 1 of the present disclosure may achieve that the vehicle light optical element 1 is also emitting light when the vehicle light is in the low-beam illumination mode, so that the appearance of the vehicle light is more beautiful.

Preferred embodiments of the present disclosure are described above in detail with reference to the accompanying drawings. However, the present disclosure is not limited to the specific details in the above embodiments. Within the scope of the technical concept of the present disclosure, various simple modifications can be made to the technical solutions of the present disclosure, and these simple modifications are all encompassed within the protection scope of the present disclosure.

In addition, it should be noted that the various specific technical features described in the above-mentioned specific embodiments can be combined in any suitable manner without contradiction. To avoid unnecessary repetition, various possible combinations will not be described separately in the present disclosure.

In addition, various different embodiments of the present disclosure may also be combined arbitrarily, and the combinations should also be regarded as contents disclosed in the present disclosure so long as they do not depart from the idea of the present disclosure.

The invention claimed is:

1. A high-beam vehicle light optical element suitable for implementation in a headlight, the high-beam vehicle light optical element comprising:
   a light incident portion, a transmission portion, and a light emitting portion successively from rear to front;
   wherein the light incident portion comprises an illuminating light incident structure and at least one high-beam light incident structure;
   wherein the high-beam light incident structure is configured to receive high-beam illuminating light for high-beam illumination when the headlight is in a high-beam illumination mode;
   wherein the illuminating light incident structure comprises an illuminating light incident surface which is adapted to receive auxiliary illuminating light during a low-beam illumination mode, thereby ensuring that the high-beam vehicle light optical element emits light when the headlight is in the low-beam illumination mode; or
   the illuminating light incident structure is a plane, an arc-shaped cylindrical body protruding rearward, a hemisphere protruding rearward, or a light-concentrating structure, and the illuminating light incident structure is adapted to receive auxiliary illuminating light during the low-beam illumination mode;
   wherein the high-beam illumination is directed through the transmission portion and the light emitting portion when the headlight is in the high-beam illumination mode, and the auxiliary illuminating light is directed through the transmission portion and the entire light emitting portion when the headlight is in the low-beam illumination mode.

2. The high-beam vehicle light optical element according to claim 1, wherein the light incident portion further comprises a concave cavity recessed toward a front end thereof, and the illuminating light incident surface of the illuminating light incident structure is provided at the front end of the concave cavity.

3. The high-beam vehicle light optical element according to claim 1, wherein:
   an area of a lengthwise section of the transmission portion gradually increases along a light transmission direction; and
   an extinction coating or extinction contours are provided on peripheral side faces of the transmission portion or a light-shielding structure is provided on peripheral side faces of the transmission portion.

4. The high-beam vehicle light optical element according to claim 1, wherein:
   a light emitting surface of the light emitting portion is a curved surface protruding forward;
   a width in a left-right direction of an end of the light emitting portion connected with the transmission portion is greater than the width in the left-right direction of an end of the transmission portion connected with the light emitting portion; and
   a height in an up-down direction of the end of the light emitting portion connected with the transmission portion is greater than the height in the up-down direction of the end of the transmission portion connected with the light emitting portion.

5. The high-beam vehicle light optical element according to claim 4, wherein:
   upper, lower, left and right side faces of the light emitting portion gradually draw closer to an optical axis along a light transmission direction;
   portions of the left and right side faces of the transmission portion proximate the light incident portion are parallel to an optical axis and extend toward the light emitting portion, and portions of left and right side faces of the transmission part close to the light emitting portion gradually draw closer to the optical axis while extending toward the light emitting portion; and
   upper and lower side faces of the transmission portion gradually tilt away from the optical axis while extending from the light incident portion toward the light emitting portion.

6. A vehicle light module, comprising, successively from rear to front, a fixing frame, a radiator, a circuit board, a light source arranged on a front end face of the circuit board, and a vehicle light optical element according to claim 1, wherein the fixing frame and the radiator are connected through at least three ball head screw assemblies; and the vehicle light optical element is fixedly connected with the circuit board and the radiator.

7. The vehicle light module according to claim 6, wherein:
   the light source comprises an illuminating light source and a high-beam light source;
   the illuminating light source is arranged corresponding to the illuminating light incident structure, and the high-beam light source is in one-to-one correspondence with the high-beam incident structure; and
   the illuminating light source is arranged above the high-beam light source, and auxiliary illuminating light is received during the low-beam illumination mode after light emitted by the illuminating light source passes through the vehicle light optical element.

8. The vehicle light optical element according to claim 6, wherein:
   a rear end of the transmission portion is connected with a mounting portion:
   lateral sides of the transmission portion are provided with reinforcing rib structures connected to the mounting portion; and
   mounting legs are further provided on a rear end face of the mounting portion and are supported on the circuit board.

9. The vehicle light module according to claim 6, wherein:
   each of the ball head screw assemblies comprises a ball head screw and a ball head nut, wherein the ball head screw comprises a ball head portion and a screw connected with the ball head portion;

the ball head nut comprises an annular body, an inner side of the annular body being provided with or integrally formed with:

four elastic clamping pieces, wherein an end of the annular body is provided with or integrally formed with four elastic clamping legs; or two elastic clamping legs and a reinforcing rib structure, the two elastic clamping legs being arranged oppositely, and the reinforcing rib structure being arranged between the two elastic clamping legs;

the elastic clamping pieces and the elastic clamping legs enclose a ball head nut cavity, and the ball head nut cavity is adapted to accommodate the ball head portion;

the elastic clamping pieces are capable of preventing the ball head portion from escaping from the ball head nut cavity;

the elastic clamping legs are adapted for clamped connection with the radiator; and a center connecting line between the ball head portions of two of the ball head screws extends in a left-right direction, and a center connecting line between the ball head portions of one of the two ball head screws and of a rest ball head screw extends in an up-down direction.

10. A vehicle headlight, comprising a plurality of vehicle light modules according to claim 6, wherein:

the plurality of vehicle light modules are arranged in the vehicle headlight in an integrated or dispersed manner; or the vehicle light modules are distributed in the vehicle headlight in a longitudinal, transverse or oblique arrangement.

11. The vehicle headlight according to claim 10, wherein:

for each of the plurality of vehicle light modules, the light source comprises an illuminating light source and a high-beam light source;

the illuminating light source is arranged corresponding to the illuminating light incident structure;

the high-beam light source is in one-to-one correspondence with the high-beam incident structure;

the illuminating light source is arranged above the high-beam light source; and auxiliary illuminating light is received during the low-beam illumination mode after light emitted by the illuminating light source passes through the vehicle light optical element.

12. The vehicle headlight according to claim 10, wherein:

each of the ball head screw assemblies comprises a ball head screw and a ball head nut, the ball head screw comprising a ball head portion and a screw connected with the ball head portion;

the ball head nut comprises an annular body, an inner side of the annular body being provided with or integrally formed with four elastic clamping pieces, and an end of the annular body being provided with or integrally formed with:

four elastic clamping legs; or two elastic clamping legs and a reinforcing rib structure, the two elastic clamping legs being arranged oppositely, and the reinforcing rib structure being arranged between the two elastic clamping legs;

the elastic clamping pieces and the elastic clamping legs enclose a ball head nut cavity that is adapted to accommodate the ball head portion;

the elastic clamping pieces are capable of preventing the ball head portion from escaping from the ball head nut cavity;

the elastic clamping legs are adapted for clamped connection with the radiator;

a center connecting line between the ball head portions of two of the ball head screws extends in a left-right direction; and a center connecting line between the ball head portions of one of the two ball head screws and of a rest ball head screw extends in an up-down direction.

13. The vehicle headlight according to claim 10, wherein for each of the vehicle light modules, the light incident portion has a concave cavity recessed toward a front end, and the illuminating light incident surface of the illuminating light incident structure is provided at a front end of the concave cavity.

14. The vehicle headlight according to claim 10, wherein:

an area of a lengthwise section of the transmission portion gradually increases along a light transmission direction; and an extinction coating or extinction contours are provided on peripheral side faces of the transmission portion, or a light-shielding structure is provided on peripheral side faces of the transmission portion.

15. The vehicle headlight according to claim 10, wherein for each of the vehicle light modules:

the light emitting surface of the light emitting portion is a curved surface protruding forward;

a width in a left-right direction of an end of the light emitting portion that is connected with the transmission portion is greater than a width in the left-right direction of an end of the transmission portion that is connected with the light emitting portion; and a height in an up-down direction of the end of the light emitting portion that is connected with the transmission portion is greater than a height in the up-down direction of the end of the transmission portion that is connected with the light emitting portion.

16. The vehicle headlight according to claim 15, wherein:

upper, lower, left and right side faces of the light emitting portion gradually draw closer to an optical axis along a light transmission direction;

portions of left and right side faces of the transmission portion proximate the light incident portion are parallel to an optical axis and extend toward the light emitting portion;

portions of the left and right side faces of the transmission portion proximate the light emitting portion gradually draw closer to the optical axis while extending toward the light emitting portion; and upper and lower side faces of the transmission portion gradually tilt away from the optical axis while extending from the light incident portion toward the light emitting portion.

17. The vehicle light module according to claim 6, wherein the light incident portion comprises a concave cavity recessed toward a front end thereof, and the illuminating light incident surface of the illuminating light incident structure is provided at the front end of the concave cavity.

18. The vehicle light module according to claim 6, wherein:

an area of a lengthwise section of the transmission portion gradually increases along a light transmission direction; and at least one of an extinction coating and extinction contours are provided on peripheral side faces of the transmission portion, or a light-shielding structure is provided on peripheral side faces of the transmission portion.

19. The vehicle light module according to claim 6, wherein:
the light emitting surface of the light emitting portion is a curved surface protruding forward;
a width in a left-right direction of an end of the light emitting portion connected with the transmission portion is greater than a width in the left-right direction of an end of the transmission portion connected with the light emitting portion; and
a height in an up-down direction of the end of the light emitting portion connected with the transmission portion is greater than a height in the up-down direction of the end of the transmission portion connected with the light emitting portion.

20. The vehicle light module according to claim 19, wherein:
upper, lower, left and right side faces of the light emitting portion gradually draw closer to an optical axis along a light transmission direction;
portions of left and right side faces of the transmission portion proximate the light incident portion are parallel to the optical axis and extend toward the light emitting portion;
portions of the left and right side faces of the transmission portion proximate the light emitting portion gradually draw closer to the optical axis while extending toward the light emitting portion; and
upper and lower side faces of the transmission portion gradually tilt away from the optical axis while extending from the light incident portion toward the light emitting portion.

* * * * *